US008161489B2

(12) United States Patent
Miyata

(10) Patent No.: US 8,161,489 B2
(45) Date of Patent: Apr. 17, 2012

(54) RESOURCE SHARING AND ALLOCATION BETWEEN A PLURALITY OF DIFFERENT RAID POLICIES ON GROUPS OF DISKS

(75) Inventor: Michitaro Miyata, Tokyo (JP)

(73) Assignee: NEC Corporation, Tokyo (JP)

( * ) Notice: Subject to any disclaimer, the term of this patent is extended or adjusted under 35 U.S.C. 154(b) by 1036 days.

(21) Appl. No.: 12/104,042

(22) Filed: Apr. 16, 2008

(65) Prior Publication Data

US 2008/0271034 A1 Oct. 30, 2008

(30) Foreign Application Priority Data

Apr. 26, 2007 (JP) ................................. 2007-117317

(51) Int. Cl.
G06F 9/46 (2006.01)
(52) U.S. Cl. ...................................................... 718/104
(58) Field of Classification Search .................. None
See application file for complete search history.

(56) References Cited

U.S. PATENT DOCUMENTS

| 6,801,992 | B2* | 10/2004 | Gajjar et al. | 711/173 |
| 6,970,987 | B1* | 11/2005 | Ji et al. | 711/162 |
| 7,467,257 | B1* | 12/2008 | Dalal et al. | 711/114 |
| 2002/0099914 | A1 | 7/2002 | Matsunami et al. | |
| 2003/0061491 | A1* | 3/2003 | Jaskiewicz et al. | 713/182 |
| 2004/0215879 | A1 | 10/2004 | Matsunami et al. | |
| 2006/0085593 | A1* | 4/2006 | Lubbers et al. | 711/114 |
| 2006/0206682 | A1* | 9/2006 | Manbert et al. | 711/170 |

FOREIGN PATENT DOCUMENTS

JP 2002-222061 8/2002

OTHER PUBLICATIONS

Thomasian, A., Branzoi, B.A., Han, C. "Performance evaluation of a heterogeneous disk array architecture" 13th IEEE International Symposium on Modeling, Analysis, and Simulation of Computer and Telecommunication Systems, 2005. Issued Sep. 27-29, 2005, pp. 517-520.*

Arata Ejiri, Mitsuhiko Ohta, Toru Yokohata "Development of distributed autonomous storage system," Technical Report of IEICE, DE2004-71, pp. 135-140, 2004.

* cited by examiner

*Primary Examiner* — Jacob A Petranek
(74) *Attorney, Agent, or Firm* — Scully, Scott, Murphy & Presser PC

(57) ABSTRACT

Disclosed is a resource allocation system including a provisional allocation execution unit that executes provisional allocation for policies other than a policy corresponding to an accepted source request, a shared resource extraction unit that extracts a resource sharable between the policy and other policies, and a determination index calculation unit that calculates an index that depends on resource sharability, and determines an allocation destination so that a storage area is allocated on a storage device with a lower resource sharability in preference to other storage devices.

21 Claims, 20 Drawing Sheets

Fig.11

| POLICY | RAID LEVEL |
|--------|------------|
| POLICY 1 | RAID1 |
| POLICY 2 | RAID5(5+P) |

FIG.12A

| STORAGE DEVICE | HDD | | RAID | | | | LOGICAL UNIT | | |
|---|---|---|---|---|---|---|---|---|---|
| | IDENTIFIER | PHYSICAL CAPACITY | IDENTIFIER | TYPE | LOGICAL CAPACITY | USED HDD | IDENTIFIER | PHYSICAL CAPACITY | USED RAID |
| a | aa | 100GB | | | | | | | |
| | ab | 100GB | | | | | | | |
| | ac | 100GB | | | | | | | |
| | ad | 100GB | | | | | | | |
| b | ba | 100GB | | | | | | | |
| | bb | 100GB | | | | | | | |
| | bc | 100GB | | | | | | | |
| | bd | 100GB | | | | | | | |
| | be | 100GB | | | | | | | |
| | bf | 100GB | | | | | | | |

FIG.12B

| STORAGE DEVICE | HDD | | RAID | | | | LOGICAL UNIT | | |
|---|---|---|---|---|---|---|---|---|---|
| | IDENTIFIER | PHYSICAL CAPACITY | IDENTIFIER | TYPE | LOGICAL CAPACITY | USED HDD | IDENTIFIER | PHYSICAL CAPACITY | USED RAID |
| a | aa | 100GB | aa | RAID1 | 100GB | aa | LU0 | 100GB | aa |
| | ab | 100GB | | | | ab | | | |
| | ac | 100GB | | | | | | | |
| | ad | 100GB | | | | | | | |
| b | ba | 100GB | | | | | | | |
| | bb | 100GB | | | | | | | |
| | bc | 100GB | | | | | | | |
| | bd | 100GB | | | | | | | |
| | be | 100GB | | | | | | | |
| | bf | 100GB | | | | | | | |

FIG.12C

| STORAGE DEVICE | HDD | | RAID | | | | LOGICAL UNIT | | |
|---|---|---|---|---|---|---|---|---|---|
| | IDENTIFIER | PHYSICAL CAPACITY | IDENTIFIER | TYPE | LOGICAL CAPACITY | USED HDD | IDENTIFIER | PHYSICAL CAPACITY | USED RAID |
| a | aa | 100GB | aa | RAID1 | 100GB | aa | LU0 | 100GB | aa |
| | ab | 100GB | | | | ab | | | |
| | ac | 100GB | | | | | | | |
| | ad | 100GB | | | | | | | |
| b | ba | 100GB | ba | RAID5 (5+P) | 500GB | ba | LU0 | 500GB | ba |
| | bb | 100GB | | | | bb | | | |
| | bc | 100GB | | | | bc | | | |
| | bd | 100GB | | | | bd | | | |
| | be | 100GB | | | | be | | | |
| | bf | 100GB | | | | bf | | | |

FIG.13A

| STORAGE DEVICE | POLICY | RAID ||||  LOGICAL UNIT ||| PHYSICAL CAPACITY |
|---|---|---|---|---|---|---|---|---|---|
| | | IDENTIFIER | TYPE | LOGICAL CAPACITY | USED HDD | IDENTIFIER | PHYSICAL CAPACITY | USED RAID | |
| a | POLICY 1 | (a-1-1) | RAID1 | 100GB | aa | (a-1-1) | 100GB | (a-1-1) | 200GB |
| | | | | | ab | | | | |
| | | (a-1-2) | RAID1 | 100GB | ac | (a-1-2) | 100GB | (a-1-2) | |
| | | | | | ad | | | | |
| | POLICY 2 | - | - | - | - | - | - | - | |
| b | POLICY 1 | (b-1-1) | RAID1 | 100GB | ba | (b-1-1) | 100GB | (a-1-1) | 300GB |
| | | | | | bb | | | | |
| | | (b-1-2) | RAID1 | 100GB | bc | (b-1-2) | 100GB | (a-1-2) | |
| | | | | | bd | | | | |
| | | (b-1-3) | RAID1 | 100GB | be | (b-1-1) | 100GB | (a-1-1) | |
| | | | | | bf | | | | |
| | POLICY 2 | (b-2-1) | RAID5 (5+P) | 500GB | ba | (b-2-1) | 500GB | (b-1-1) | |
| | | | | | bb | | | | |
| | | | | | bc | | | | |
| | | | | | bd | | | | |
| | | | | | be | | | | |
| | | | | | bf | | | | |

FIG.13B

| STORAGE DEVICE | POLICY | RAID |||| LOGICAL UNIT ||| PHYSICAL CAPACITY |
|---|---|---|---|---|---|---|---|---|---|
| | | IDENTIFIER | TYPE | LOGICAL CAPACITY | USED HDD | IDENTIFIER | PHYSICAL CAPACITY | USED RAID | |
| a | POLICY 1 | (a-1-2) | RAID1 | 100GB | ac | (a-1-2) | 100GB | (a-1-2) | |
| | | | | | ad | | | | |
| | POLICY 2 | - | - | - | - | - | - | - | 0GB |
| b | POLICY 1 | (b-1-1) | RAID1 | 100GB | ba | (b-1-1) | 100GB | (a-1-1) | |
| | | | | | bb | | | | |
| | | (b-1-2) | RAID1 | 100GB | bc | (b-1-2) | 100GB | (a-1-3) | |
| | | | | | bd | | | | |
| | | (b-1-3) | RAID1 | 100GB | be | (b-1-1) | 100GB | (a-1-1) | |
| | | | | | bf | | | | |
| | POLICY 2 | (b-2-1) | RAID5 (5+P) | 500GB | ba | (b-2-1) | 500GB | (b-1-1) | 500GB |
| | | | | | bb | | | | |
| | | | | | bc | | | | |
| | | | | | bd | | | | |
| | | | | | be | | | | |
| | | | | | bf | | | | |

FIG.14A

| STORAGE DEVICE | POLICY 1 | | POLICY 2 | |
|---|---|---|---|---|
| | HDD IDENTIFIER | PHYSICAL CAPACITY | HDD IDENTIFIER | PHYSICAL CAPACITY |
| a | – | – | NONE | 0 |
| b | – | – | ba | 100GB |
| | | | bb | 100GB |
| | | | bc | 100GB |
| | | | bd | 100GB |
| | | | be | 100GB |
| | | | bf | 100GB |

FIG.14B

| STORAGE DEVICE | POLICY 1 | | POLICY 2 | |
|---|---|---|---|---|
| | HDD IDENTIFIER | PHYSICAL CAPACITY | HDD IDENTIFIER | PHYSICAL CAPACITY |
| a | NONE | 0 | – | – |
| b | ba | 100GB | – | – |
| | bb | 100GB | | |
| | bc | 100GB | | |
| | bd | 100GB | | |
| | be | 100GB | | |
| | bf | 100GB | | |

FIG.15A

| STORAGE DEVICE | DETERMINATION INDEX |
|---|---|
| a | 200GB |
| b | 150GB |

FIG.15B

| STORAGE DEVICE | DETERMINATION INDEX |
|---|---|
| a | 0GB |
| b | 250GB |

Fig.17

| POLICY | RAID LEVEL | DISK ROTATIONAL SPEED |
|---|---|---|
| POLICY 1 | NONE | 10krpm OR HIGHER |
| POLICY 2 | NONE | 15krpm OR HIGHER |

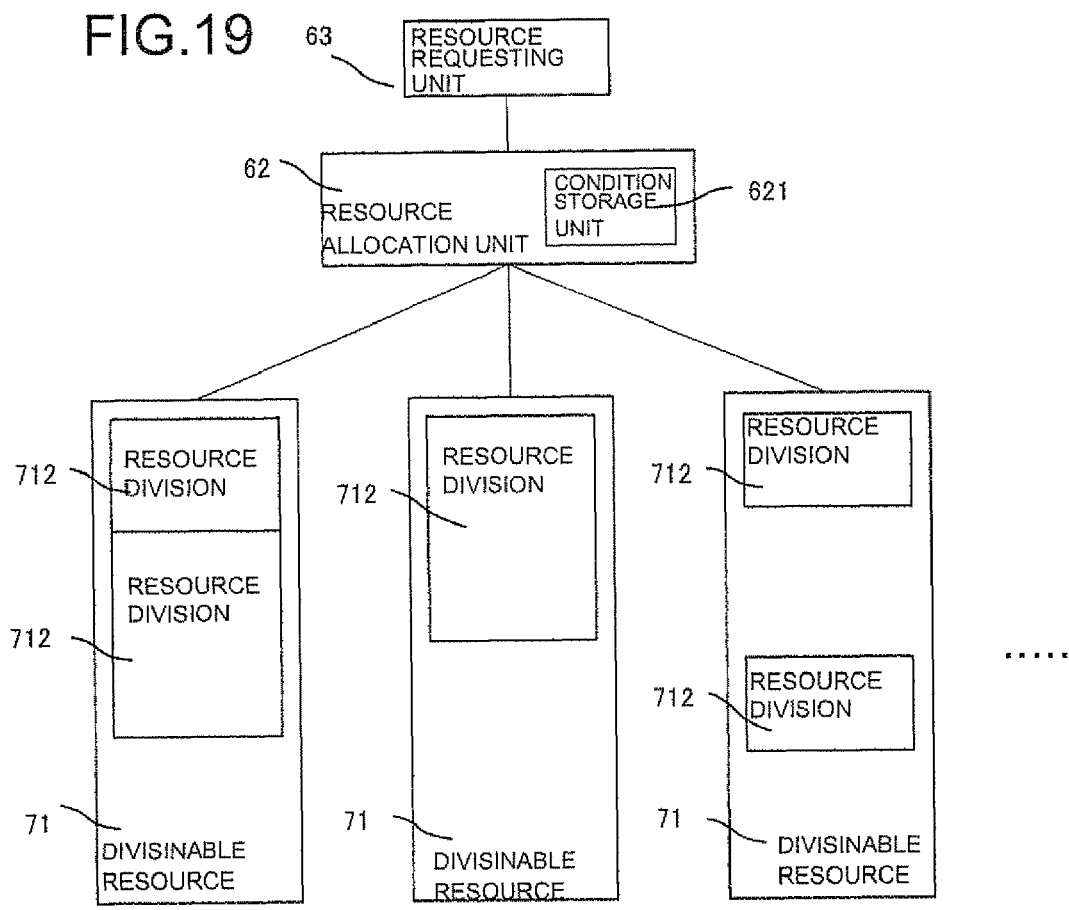

RESOURCE SHARING AND ALLOCATION BETWEEN A PLURALITY OF DIFFERENT RAID POLICIES ON GROUPS OF DISKS

REFERENCE TO RELATED APPLICATION

This invention is based on and claims the benefit of the priority of Japanese Patent Application No. 2007-117317, filed on Apr. 26, 2007, the disclosure of which is incorporated herein in its entirety by reference thereto.

FIELD OF THE INVENTION

The present invention relates to a resource allocation system, a resource allocation method, and a resource allocation program.

BACKGROUND OF THE INVENTION

Conventionally, SAN (Storage Area Network), where one or more host computers (hereinafter called hosts) and one or more storage devices are connected via a network, is known as a mode of connection between hosts and storage devices.

In comparison with DAS (Direct Attached Storage) that is a one-to-one direct connection between a host and a storage device, SAN allows multiple hosts to share the resources of one storage device or to distribute storage areas among multiple storage devices, giving the user an advantage of flexible resource usage in that accesses to, or the load of, storage devices can be distributed or in that a data loss risk can be reduced.

When multiple storage areas are distributed among multiple storage devices, the effect achieved by distributing the accesses to, and the load of, storage devices or by reducing the data loss risks at a failure time depends largely on which storage device's resources the storage areas are allocated.

Especially, in a system where new storage area allocations are sequentially requested, the optimum storage area layout cannot be designed in advance. So, in comparison with a system where all layout storage areas to be arranged are determined in advance it is difficult to determine to which storage device a new storage area, requested by each request, is to be allocated.

Non-Patent Document 1 discloses a method for determining an area which is on one of multiple storage devices and to which a new storage area is to be allocated. In this method, the storage device on which the new storage area is to be allocated is determined using the free storage capacity (allocatable capacity) or the free capacity ratio of each storage device as a measure of whether the storage area can be allocated thereon.

Some storage devices provide not only the storage capacity but also more sophisticated functions.

For example, the known sophisticated functions are:

the function to reduce the data loss risk and increase the data transfer speed by RAID(Redundant Arrays of Inexpensive Disks) in which multiple hard disk drives (hereinafter abbreviated as HDD) are used as logical storage areas, and the function to create replications in the same storage device or another storage device.

Another point is a difference in the storage device specifications among storage devices such as the type of HDDs included in a storage device or the standard for the corresponding network interface.

So, the allocation of a storage area requires a consideration not only for the storage capacity but also for the function and the specifications of the storage device according to the required performance and reliability.

A known method for allocating a storage area is that, with the allocation-time conditions defined as a policy, the storage area is allocated according to the policy.

For example, Patent Document 1 describes a method of allocating storage areas to RAID groups. In this method, RAID groups are created in storage in advance for different conditions such as different HDD performances and different RAID levels and policies are defined for those RAID groups. In response to a storage area allocation request corresponding to a policy, a storage area is allocated to a RAID group corresponding to the requested policy.

In the method described in Patent Document 1, when storage areas are allocated to all areas of the RAID group corresponding to a policy, a new RAID group must be created for the policy to maintain the correspondence between RAID groups and policies.

A storage area allocation method using the free capacity or the free capacity ratio as a measure, such as the method described in Non-Patent Document 1, can be used in the policy-based storage area allocation method as a method for determining a storage device to which a RAID group corresponding to a policy is to be newly allocated.

[Non-Patent Document 1] Arata Ejiri, Mitsuhiko Ohta, Toru Yokohata "Development of distributed autonomous storage system" Technical Report of IEICE, DE2004-71, pp. 135-140, 2004

[Patent Document 1] Japanese Patent Publication Kokai JP-A No. 2002-222061

The following analyses are given by the present invention.

If a storage device in which a storage area is allocated is determined based on the allocatable capacity or the free capacity ratio of a requested policy when multiple policies are defined, a problem arises that the resources allocatable to other policies are consumed with the result that the resources cannot be fully utilized.

The above mentioned problem will be described with reference to FIGS. 20A to 20D. There are two storage devices: a storage device 1*a* having four HDDs (141*aa*, 141*ab*, 141*ac*, 141*ad*) and a storage device 1*b* having six HDDs (141*ba*, 141*bb*, 141*bc*, 141*bd*, 141*be*, 141*bf*). Assume that RAID1 is defined as policy 1 and that RAID5(5+P) (RAID is composed of 6 HDDs where the parity of the data striped on 5 HDDs is stored on another one HDD) is defined as policy 2.

Also assume that each HDD has the capacity of 100 GB.

FIGS. 20A and 20B show that storage areas are allocated neither on the HDDs in the storage device 1*a* nor on the HDDs in the storage device 1*b*.

At this time, when a storage area allocation request (request 1) of "policy 1, 100 GB" is received, the 200 GB of logical capacity can be allocated on the storage device 1*a* for policy 1 with RAID1 of 100 GB configured, for example, by each of the combination of HDD 141*aa* and HDD 141*ab* and the combination of HDD 141*ac* and HDD 141*ad*. Similarly, the 300 GB of logical capacity can be allocated on the storage device 1*b* with RAID1 of 100 GB configured, for example, by each of the combination of HDD 141*ba* and HDD 141*bb*, the combination of HDD 141*bc* and HDD 141*bd*, and the combination of HDD 141*be* and HDD 141*bf*. In this case, because the allocatable capacity of the storage device 1*b* is larger, RAID1 is built on the storage device 1*b* for allocating the storage area.

FIGS. 20C and 20D show the storage devices 1*a* and 1*b* in which 100 GB of logical capacity is allocated by building RAID1 (RAID 142*ba*) by the HDD 1411*ba* and HDD 141*bb*.

Next, when a storage area allocation request (request 2) of "policy 2, 500 GB" is received after the 100 GB of logical storage was allocated as described above, the requested storage area cannot be allocated because neither the storage device 1a nor the storage device 1b has unallocated HDDs on which RAID5(5+P) can be built.

In this case, however, if the storage device 1a was allocated to request 1, request 2 could be allocated to the storage device 1b. So, this condition indicates that the resources of the HDD 141 are not fully utilized.

As described above, in case there are multiple policies for storage area allocation and storage area allocation requests are issued one after another, a storage area cannot sometimes be allocated to a request in spite of the fact that a storage area could be allocated to that request if an earlier allocation request was allocated to some other resources. The reason is that the resources, which are allocable for one policy, are already used for another policy at the resource allocation time of the another policy.

SUMMARY OF THE INVENTION

It is an object of the present invention to provide a resource allocation system that reduces the generation of a condition in which, when there are multiple storage area allocation policies and storage area allocation requests are issued one after another, a storage area cannot sometimes be allocated to a request in spite of the fact that a storage area could be allocated to that request if an earlier allocation request was allocated to some other resources.

The above and other objects may be solved by the present invention which the following general configuration.

A resource allocation system, in accordance with one aspect of the present invention, includes a provisional allocation execution unit that executes provisional allocation for policies other than a requested policy, a shared resource extraction unit that extracts a resource sharable between the requested policy and other policies, and a determination index calculation unit that calculates an index that depends on resource sharability, and determines an allocation destination so that a storage area is allocated on a storage device with a lower resource sharability.

A resource allocation system according to the present invention comprises:

a resource information storage unit that holds resource information on a plurality of storage devices;

a policy storage unit that stores policy information;

a provisional allocation execution unit that derives a provisional allocation and stores a logical capacity in the provisional allocation information storage unit based on the resource information on the storage devices stored in the resource information storage unit and the policy information stored in the policy storage unit, the provisional allocation corresponding to an allocation configuration in which a maximum capacity of a storage area satisfying a condition of a policy can be allocated on a storage device, the logical capacity being found when the provisional allocation is performed;

a shared resource extraction unit that extracts sharable resources, which can be temporarily allocated for a plurality of policies when the policies are temporarily allocated on a storage device, based on the information stored in the resource information storage unit and the provisional allocation information storage unit and stores shared resource information in the shared resource information storage unit;

a determination index calculation unit that calculates a determination index for each storage device based on the logical capacity stored in the provisional allocation information storage unit and the shared resource information stored in the shared resource information storage unit and stores the calculated determination index in the determination index storage unit, the determination index being a value of an allocatable capacity corrected by considering resource sharability among policies; and a determination unit that determines a storage device on which to allocate by comparing the determination indexes of the storage devices stored in the determination index storage unit.

The resource allocation system according to the present invention may further comprise:

a request processing unit that receives a request entered from a requesting device and sends an allocation completion response to the requesting device when allocation processing is completed;

a resource information collection unit that collects resource information on the storage devices and stores the collected resource information in the resource information storage unit; and an allocation instruction unit that instructs the storage device to perform allocation and, when an allocation execution completion notification is received from the storage device, instructs the request processing unit to send the allocation completion response to the request processing unit.

The resource allocation system according to the present invention selects an area, which is a resource of the determined storage device and which has a lower sharability, as an area to which a storage area is to be allocated. In the present invention, the determination unit compares the determination indexes of the storage devices and, based on a relation between the determination index and the resource sharability, selects the storage device with a higher determination index if a value of the determination index corresponding to a relatively higher resource sharability is low and a value of the determination index corresponding to a relatively lower resource sharability is high, or selects the storage device with a lower determination index if a value of the determination index corresponding to a relatively higher resource sharability is high and a value of the determination index corresponding to a relatively lower resource sharability is low, and selects an area with a lower sharability degree from areas of the selected storage device as an area to which a storage area is allocated.

In the resource allocation system according to the present invention, for a combination of a storage device and a policy, the determination index is given by a product of an allocatable logical capacity that is a logical capacity when a maximum capacity allocatable for the policy is allocated on the storage device and an adjustment coefficient that is an index representing the insignificance of resource sharability, the adjustment coefficient having a value that gets smaller as an area of a resource allocatable for a policy and allocatable also for an other policy on the storage device gets larger and as a number of policies allocatable to the area gets larger.

In the resource allocation system according to the present invention, the adjustment coefficient is calculated by dividing a resource amount allocatable for the policy and with a sharability degree m by the resource amount allocatable for the policy; multiplying the division result by an inverse number of the sharability degree m; and calculating a sum of the multiplication result for all values of m.

In the resource allocation system according to the present invention, when the resource amount allocatable for the policy is 0, the adjustment coefficient is 1.

In the resource allocation system according to the present invention, the resource information collection unit, the resource information storage unit, the provisional allocation execution unit, the provisional allocation information storage unit, the shared resource extraction unit, the shared resource information storage unit, the determination index storage unit, the determination index calculation unit, the determination unit, the allocation instruction unit, and the request processing unit are provided in a management server.

In the resource allocation system according to the present invention, the resource information collection unit, the resource information storage unit, the provisional allocation execution unit, the provisional allocation information storage unit, the shared resource extraction unit, the shared resource information storage unit, the determination index storage unit, and the determination index calculation unit are provided in the storage device, and the determination unit, the allocation instruction unit, and the request processing unit are provided in a management server.

A resource allocation method according to the present invention comprises:

a provisional allocation execution step of deriving a provisional allocation and storing a logical capacity in a provisional allocation information storage unit based on resource information on storage devices stored in a resource information storage unit and policy information stored in a policy storage unit, the provisional allocation corresponding to an allocation configuration in which a maximum capacity of a storage area satisfying a condition of a policy can be allocated on a storage device, the logical capacity being found when the provisional allocation is performed;

a shared resource extraction step of extracting sharable resources, which can be temporarily allocated for a plurality of policies when the provisional allocation of each policy is performed for a storage device, based on the information stored in the resource information storage unit and the provisional allocation information storage unit, and storing shared resource information in a shared resource information storage unit;

a determination index calculation step of calculating a determination index for each storage device based on the logical capacity stored in the provisional allocation information storage unit and the shared resource information stored in the shared resource information storage unit and storing the calculated determination index in a determination index storage unit, the determination index being a value of an allocatable capacity corrected by considering resource sharability among policies; and a determination step of determining a storage device in which a storage area is to be allocated by comparing the determination indexes of the storage devices stored in the determination index storage unit.

A computer program according to the present invention causes a computer to execute:

a provisional allocation execution process of deriving a provisional allocation and storing a logical capacity in a provisional allocation information storage unit based on resource information on storage devices stored in a resource information storage unit and policy information stored in a policy storage unit, the provisional allocation corresponding to an allocation configuration in which a maximum capacity of a storage area satisfying a condition of a policy can be allocated on a storage device, the logical capacity being found when the provisional allocation is performed;

a shared resource extraction process of extracting sharable resources, which can be temporarily allocated for a plurality of policies when the provisional allocation of each policy is performed for a storage device, based on the information stored in the resource information storage unit and the provisional allocation information storage unit, and storing shared resource information in a shared resource information storage unit;

a determination index calculation process of calculating a determination index for each storage device based on the logical capacity stored in the provisional allocation information storage unit and the shared resource information stored in the shared resource information storage unit and storing the calculated determination index in a determination index storage unit, the determination index being a value of an allocatable capacity corrected by considering resource sharability among policies; and a determination process of determining a storage device in which a storage area is to be allocated by comparing the determination indexes of the storage devices stored in the determination index storage unit.

A system in another aspect of the present invention allocates a resource which, if already allocated, is not used for another allocation. The resource allocation system comprises means that accepts a resource request; and means that, when one resource request is received, determines an allocation from allocation candidates corresponding to a condition specified by the one resource request in such a way that there will be a higher possibility that an allocation requested by another resource request, which will be received after executing a resource allocation of the one resource request, is satisfied.

In the present invention, on an assumption that, when one or more resources are included in one allocation candidate and are also included in other one or more allocation candidates, the more the other allocation candidates are, the higher an overlapping degree is, the means that determines an allocation selects an allocation candidate with a lower overlapping degree from a plurality of allocation candidates, corresponding to the condition specified by the one resource request, in preference to other allocation candidates with consideration for the overlapping degree among the allocation candidates, whereby the resource allocation system suppresses a generation of a condition in which, when the another resource request is accepted after the allocation is performed for the one resource request, an allocation satisfying an allocation condition of the another resource request cannot be satisfied because the allocation has been performed for the one resource request and, as a result, a part of a resource for the another resource request becomes insufficient.

A system in another aspect of the present invention comprises:

at least one resource group that includes a plurality of resource elements wherein resource elements are allocated exclusively to a resource set in the resource group and a resource element already allocated to one resource set is not allocated to another resource set and resource requests are issued, one at a time, the resource allocation system further comprising:

on an assumption that, when one or more resource elements are included in one resource set allocation candidate and are also included in other one or more resource set allocation candidates, the more the other allocation candidates are, the higher a degree of overlapping is, a resource allocation unit that, when one resource request is received, selects an allocation candidate with a lower degree of overlapping with other allocation candidates from resource set allocation candidates satisfying an allocation condition specified by the resource request in preference to other allocation candidates and allocates one or more resource elements to the resource set.

A system in another aspect of the present invention comprises:

at least one divisible resource wherein when a resource request is received, resource division is performed exclusively within the resource and a divided resource is provided to the resource request and resource requests are issued, one at a time, the resource allocation system further comprising:

on an assumption that, when one or more resource divisions are included in one resource division allocation candidate and are also included in other one or more resource division allocation candidates, the more the other allocation candidates are, the higher a degree of overlapping is, a resource allocation unit that, when one resource request is received, selects a division candidate with a lower degree of overlapping with other allocation candidates from resource division candidates satisfying an allocation condition specified by the resource request in preference to other division candidates and performs the resource division.

The present invention suppresses the generation of a condition in which, when a resource allocation is performed for one resource request and, after that, another resource request is issued, an allocation satisfying the allocation condition of another resource request cannot be satisfied because the allocation has been performed for one resource request and, as a result, a part of a resource for another resource request becomes insufficient. The reason is that the present invention determines a resource allocation destination with consideration for the degree of overlapping between one allocation and another allocation.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 11 is a tabular diagram showing an example of a policy storage unit in the first example of the present invention.

FIGS. 12A to 12C are tabular diagrams showing an example of a resource information storage unit in the first example of the present invention.

FIGS. 13A and 13B are tabular diagrams showing an example of a provisional allocation information storage unit in the first example of the present invention.

FIGS. 14A and 14B are tabular diagrams showing an example of a shared resource information storage unit in the first example of the present invention.

FIGS. 15A and 15B are tabular diagrams showing an example of a determination index storage unit in the first example of the present invention.

FIG. 17 is a tabular diagram showing an example of a policy storage unit in the second example of the present invention.

FIG. 19 is a diagram showing a fourth example of the present invention.

PREFERRED MODES OF THE INVENTION

The present invention described above will be described more in detail with reference to the drawings.

FIRST EXAMPLE

Figure 1:
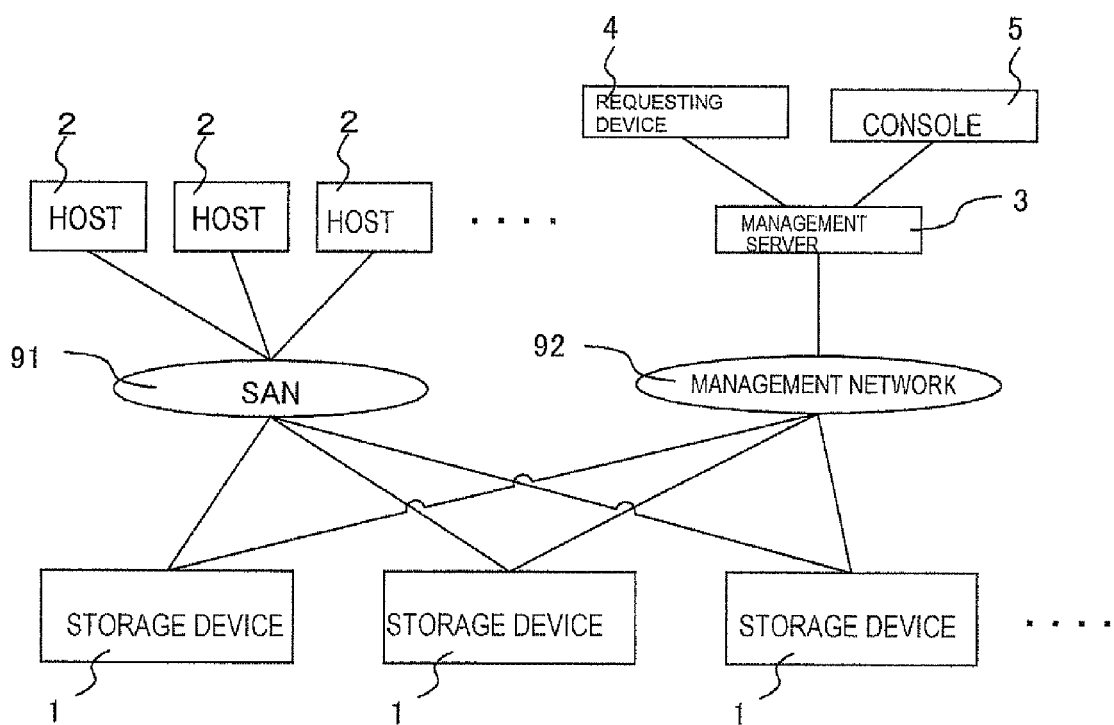
FIG. 1 is a block diagram showing the configuration of a system in a first example and a second example of the present invention.

FIG. 1 is a diagram showing the configuration of a system in a first example of the present invention. Referring to FIG. 1, the system in the first example of the present invention comprises multiple storage devices 1, one or more hosts 2, a management server 3, a requesting device 4, a console 5, a SAN(Storage Area Network) 91, and a management network 92.

The storage device 1 records data received from the host 2, and supplies recorded data to the host 2, according to a request from the host 2.

The storage device 1 also supplies resource information stored in the storage device 1, and allocates a storage area to the resource owned by the storage device 1, according to a request from the management server 3.

The host 2 accesses the storage device 1 to write data to, or read data from, it.

The management server 3 holds policy information, which is a condition for storage area allocation, according to an input from the console 5.

The management server 3 also determines a resource, to which a storage area is to be allocated, from the resources of the storage device 1 according to a storage area allocation request received from the requesting device 4, and issues an allocation instruction to the storage device 1.

The requesting device 4 issues a storage area allocation request to the management server 3.

When a storage area allocation request is issued to the management server 3, the requesting device 4 specifies one of the policies, defined in the management server 3, and an allocation capacity.

The console 5 communicates with the management server 3 to define a new policy or to change or delete a defined policy.

The SAN 91 provides a communication path via which storage devices 1 and hosts 2 are connected for sending and receiving access instructions and data.

The management network 92 provides a communication path between the storage devices 1 and the management servers 3.

Figure 2:
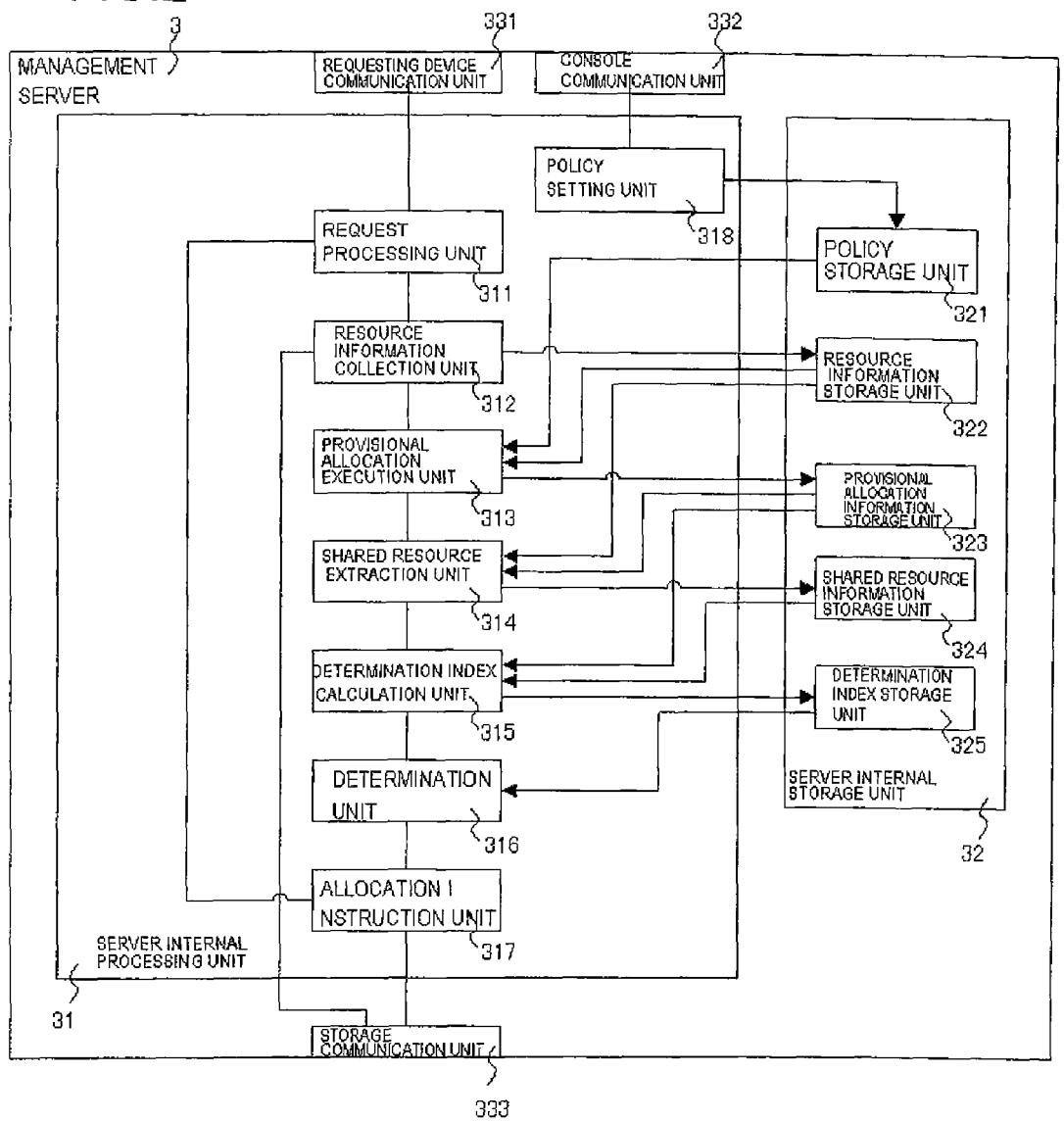
FIG. 2 is a block diagram showing the detail of a management server 3 in the first example of the present invention.

FIG. 2 is a diagram showing an example of the configuration of the management server 3 shown in FIG. 1. Referring to FIG. 2, the management server 3 comprises a server internal processing unit 31, a server internal storage unit 32, a requesting device communication unit 331, a console communication unit 332, and a storage communication unit 333.

The server internal processing unit 31 comprises a request processing unit 311, a resource information collection unit 312, a provisional allocation execution unit 313, a shared resource extraction unit 314, a determination index calculation unit 315, a determination unit 316, an allocation instruction unit 317, and a policy setting unit 318.

The request processing unit 311 receives a request entered from the requesting device 4 via the requesting device communication unit 331. When allocation processing is completed, an allocation completion response is sent to the requesting device 4 via the requesting device communication unit 331.

The resource information collection unit 312 collects the resource information on the storage devices 1 via the storage communication unit 333 and the management network 92 and stores the collected information in a resource information storage unit 322.

The resource information includes the following information.

- Physical resource information on the number and the attribute of physical components of the storage devices 1 such as hard disk drives (hereinafter called "HDD"), cache memories, and ports
- Setting information such as RAID (Redundant Arrays of Inexpensive Disks) configuration and the logical unit allocation status
- Functions of the storage devices 1

The resource information collected by the resource information collection unit 312 may include only the required information according to a policy specified by an allocation request.

The provisional allocation execution unit 313 derives an allocation configuration in which the maximum capacity of a storage area, which satisfies the condition of a specific policy, can be allocated on a specific storage device 1, based on the resource information on the storage device 1 stored in the resource information storage unit 322 and the policy information stored in a policy storage unit 321 (this processing is called "provisional allocation"), and stores the derived provisional allocation configuration in a provisional allocation information storage unit 323.

The provisional allocation execution unit 313 also calculates the logical capacity determined by the provisional allocation and stores the calculated logical capacity in the provisional allocation information storage unit 323. The information stored in the provisional allocation information storage unit 323 is called "provisional allocation information".

Provisional allocation is performed for the combinations of all storage devices 1 and all policies.

The allocation configuration in which the maximum capacity can be allocated for the combination of one storage device 1 and one policy is not sometimes determined uniquely. In this case, it is desirable to derive multiple allocation configurations in which the maximum capacity can be allocated and, after that, select the combination that maximizes the determination index that will be described later. It should be noted that the effect of the present invention can be achieved also by selecting any one of allocation configurations in which the maximum capacity can be allocated.

For a policy other than the one specified for the allocation request, there is no need for calculating the logical capacity and for storing the logical capacity in the provisional allocation information storage unit 323 at the time the provisional allocation is performed.

The shared resource extraction unit 314 extracts the resources temporarily allocatable to multiple policies (hereinafter called "sharable resources") when the provisional allocation of each policy is performed for a specific storage device 1 based on the information stored in the resource information storage unit 322 and the provisional allocation information storage unit 323, and stores the extracted sharable resources in a shared resource information storage unit 324 (hereinafter, this processing called "shared resource extraction"). Shared resource extraction is performed for all storage devices.

The determination index calculation unit 315 calculates the determination index of each storage device 1 based on the logical capacity stored in the provisional allocation information storage unit 323 and the shared resource information stored in the shared resource information storage unit 324 and stores the calculated determination index in a determination index storage unit 325.

The determination index is the value of an allocatable capacity corrected by considering the resource sharability among policies. The concept of resource sharability and the calculation method of the determination index will be described later.

The determination unit 316 compares the determination indexes of the storage devices 1 stored in the determination index storage unit 325 to determine the storage device 1 to which the storage area is to be allocated. An area to which the storage area is allocated is an area which is selected from the areas of the determined storage device 1 and which has the lowest sharability that will be described later.

The allocation instruction unit 317 issues an allocation instruction to the storage device 1, to which a storage area is determined to be allocated, via the storage communication unit 333 and the management network 92.

When an allocation execution completion notification is received from the storage device 1, the allocation instruction unit 317 instructs the request processing unit 311 to send the allocation completion response to the requesting device 4.

The policy setting unit 318 stores a policy, entered from the console S via the console communication unit 332, into the policy storage unit 321.

When a request to change or delete a defined policy is received from the console 5, the policy setting unit 318 changes or deletes policy information, stored in the policy storage unit 321, according to the request.

The server internal storage unit 32 comprises the policy storage unit 321, resource information storage unit 322, provisional allocation information storage unit 323, shared resource information storage unit 324, and determination index storage unit 325.

The policy storage unit 321 stores policy information.

The resource information storage unit 322 stores resource information.

The provisional allocation information storage unit 323 stores provisional allocation information.

The shared resource information storage unit 324 stores shared resource information.

The determination index storage unit 325 stores determination indexes.

The requesting device communication unit 331 communicates with the requesting device 4.

The console communication unit 332 communicates with the console 5.

The storage communication unit 333 communicates with the storage devices 1 via the management network 92.

Although connected directly to the management server 3 in this example, the requesting device 4 may also be connected to the management server 3 via the management network 92 or a separately-provided network.

Although shown as a standalone device in this example, the requesting device 4 may also be installed as a software component in the storage device 1 or the host 2.

Although connected directly to the management server 3 in this example, the console 5 may also be connected to the management server 3 via the management network 92 or a separately-provided network.

Although shown as a standalone device in this example, the console 5 may also be installed as a software component in the same hardware unit in which the requesting device 4 is installed.

The following describes the concept of resource sharability with reference to FIG. 4.

In the description below, the concept of a set in mathematics is used, and the symbol "∩" represents the intersection (product set) of sets and the symbol "−" represents the difference set.

For the sake of description, assume an example in which there are two storage devices 1, storage device 1a and storage device 1b, and the two types of policy, P1 and P2, are defined.

Figure 4A:
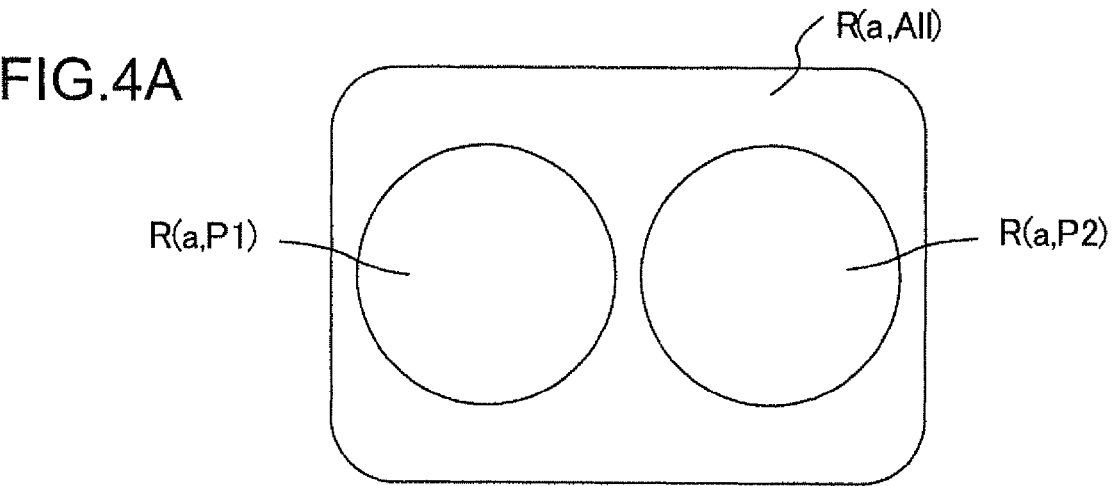
FIGS. 4A and 4B are diagrams showing the concept of resource sharability in the first example of the present invention.

FIG. 4A is a diagram showing the concept of the relation between the resources in the storage device 1a and the policies.

In FIG. 4A,

R(a,A11) means the set of all resources in the storage device 1a.

R(a,P1) means the set of resources allocatable to the defined policy P1.

R(a,P2) means the set of resources allocatable to the defined policy P2.

Figure 4B:
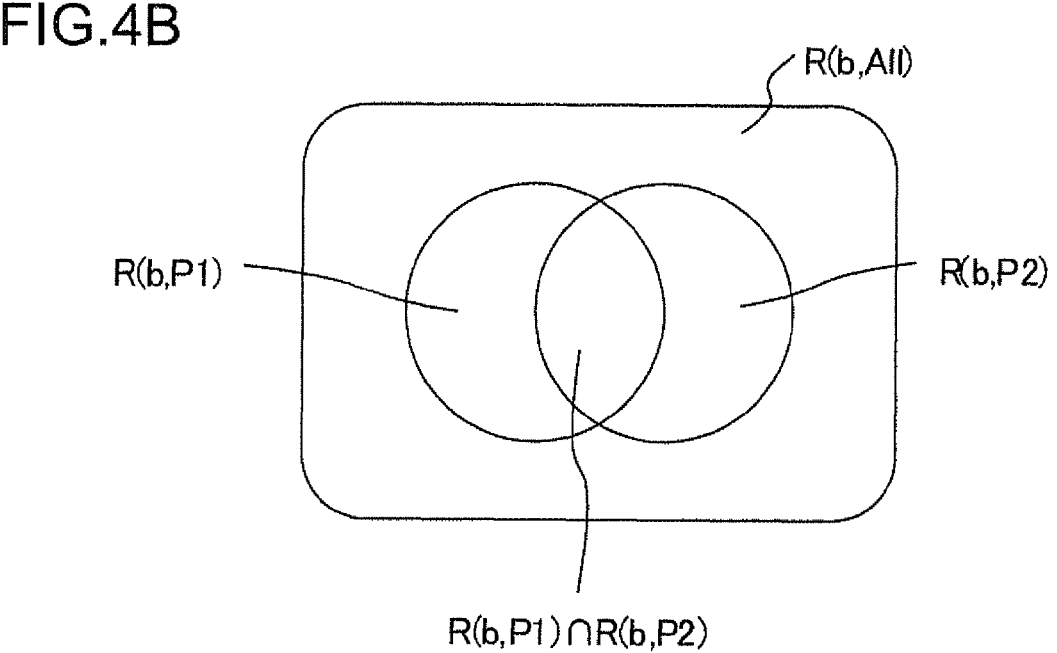

FIG. 4B is a diagram showing the concept of the relation between the resources in the storage device 1b and the policies.

In FIG. 4B,

R(b,A11) means the set of all resources in the storage device 1b.

R(b,P1) means the set of resources allocatable to the defined policy P1.

R(b,P2) means the set of resources allocatable to the defined policy P2.

In FIG. 4A, there is no overlapping area (R(a,P1)∩R(a,P2)) between R(a,P1) and R(a,P2). This means that there is no resource in the storage device 1a allocatable for policy P1 and allocatable for policy P2.

On the other hand, in FIG. 4B, there is an overlapping area (R(b,P1)∩R(b,P2)) between R(b,P1) and R(b,P2).

R(b,P1)∩R(b,P2) means the resources in the storage device 1b allocatable both to policy P1 and to policy P2.

In the description below, it is assumed that the larger the area allocatable to multiple policies is (such as R(b,P1)∩R(b,P2)), the higher the resource sharability between policies is.

In addition, the number of policies allocatable to a resource is defined as a sharability degree.

For example, in FIG. 4B, the sharability degree of the area (R(b,P1)−R(b,P2)), which is the area of R(b,P1) but is not the area of R(b,P2), is 1 and the sharability degree of the area R(b,P1)∩R(b,P2) is 2.

The larger the sharability degree is, the higher the resource sharability is.

That is, the resource sharability is defined by the size of an allocatable area overlapping between policies and the sharability degree. Note that there is no need to include the both but may include only one of them.

In the present invention, when an allocation request for policy P1 is generated, a storage device in which a storage area is to be allocated is determined by considering not only the relation between R(a,P1) and R(b,P1) that are resources allocatable on the storage devices 1a and 1b, the ratio of R(a,P1) to R(a,A11), and the ratio of R(b,P1) to R(b,A11) but also the magnitudes of R(a,P1)∩R(a,P2) and R(b,P1)∩R(b,P2), which mean the magnitudes of resource sharability, and the sharability degrees.

That is, when calculating a determination index which is the index for determining a storage device in which a storage area is to be allocated, a factor is introduced that decreases the determination index when the resource sharability is higher in order to determine the storage device 1, which has a higher determination index, as the storage device on which the storage area is allocated.

The following describes a determination index calculation expression using an actual example. The present invention is not limited to the expression that will be described below. Expression (1a) is an example of the determination index calculation expression.

$$\text{Determination index}(k,n) = \text{Allocatable logical capacity}(k,n) \times \text{Adjustment coefficient}(k,n) \qquad (1a)$$

In expression (1a) described above and expression (1b) given below, k means the identification symbol k of a storage device 1 and n means the policy identification symbol n of a policy.

For example, the determination index (k, n) means that the determination index is determined for each combination of the storage device 1 k and policy n.

The determination index(k,n) is the product of the allocatable logical capacity(k,n), which is the logical capacity when the maximum allocatable capacity of policy n is allocated to the storage device 1 k, and the adjustment coefficient(k,n).

The adjustment coefficient(k,n) is a coefficient calculated by expression(1b).

$$\text{Adjustment coefficient}(k, n) = \sum_m \left( \frac{\text{Amount of resources allocatable for policy } n \text{ and with sharability degree of } m}{\text{Amount of resources allocatable for policy } n} \times \frac{1}{m} \right) \qquad (1b)$$

Note that the adjustment coefficient(k,n)=1 when the amount of resources allocatable for policy n is 0.

The adjustment coefficient(k, n) is a value calculated as follows. The amount of resources allocatable for policy n and with the sharability degree of m is divided by the amount of resources allocatable for policy n, the result is multiplied by the inverse number of the sharability degree of m, and the sum (Σ) is calculated for all values of m. Note that, when the amount of resources allocatable for policy n is 0, the adjustment coefficient(k,n) is 1. In the expression (1b), (1/m)^p may be multiplied instead of 1/m as will be described later or, any function g(m) assuming a positive value which becomes small if m is large, may also be multiplied.

The adjustment coefficient(k,n), an index representing the insignificance of resource sharability, becomes smaller as the area of the resources on the storage device 1 k allocatable for policy n and allocatable for the other policy is larger or as the number of policies for which the area is allocatable is larger.

The following describes the adjustment coefficient more in detail using an example.

FIG. 5A to FIG. 5E show examples in which the statuses of policy P1, policy P2, and policy P3 (policy P3 is shown only in FIG. 5D), for which the resources on the storage device 1a are allocatable, are different. The numeric values in the figures indicate the resource amounts. The numeric values, shown for illustration only, may be in any units. In practice, the unit of allocated resources is used; for example, bytes which are used to represent the physical capacity of an HDD are used. When the logical resource amount and the physical resource amount are different, for example, when a RAID configuration is used, the resource amount by which all policies can be compared must be used.

For example, the logical capacities which are allocated using the same physical resource amount are different between the RAID0 configuration in which multiple HDDs are used in the striping mode and the RAID1 configuration in which multiple HDDs are used in the mirroring mode. So, the physical resource amount is used as the common resource amount when the resource amount is calculated.

Figure 5A:
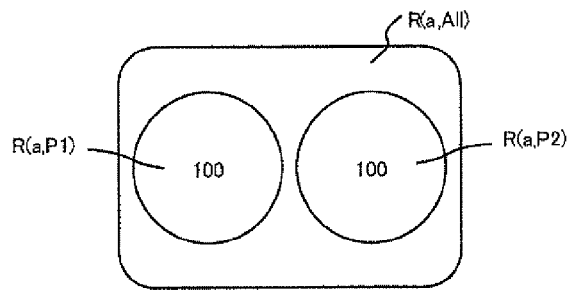
FIGS. 5A to 5E are diagrams showing an adjustment coefficient in the first example of the present invention.

FIG. 5A shows an example in which the resource area allocatable for policy P1 and the resource area allocable for policy P2 do not overlap at all.

In the case of FIG. 5A, the adjustment coefficient of policy P1 on the storage device 1a is calculated as 1 by expression (2a) in which the actual numeric values are assigned to expression 1(b).

$$\text{Adjustment coefficient}(a, P1) = \left(\frac{100}{100} \times \frac{1}{1}\right) = 1 \quad (2a)$$

Figure 5B:
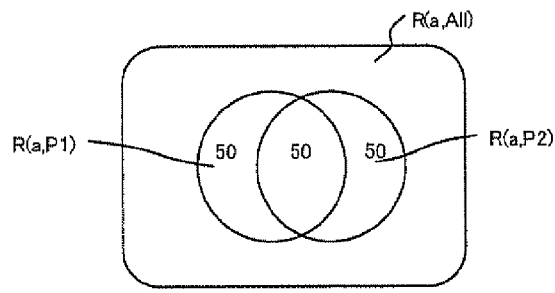

FIG. 5B shows an example in which the resource area allocatable for policy P1 and the resource area allocatable for policy P2 partially overlap. In the case of FIG. 5B, the adjustment coefficient of policy P1 on the storage device 1a is calculated as 0.75 by expression (2b) in which the actual numeric values are assigned to expression (1b).

$$\text{Adjustment coefficient}(a, P1) = \left(\frac{50}{100} \times \frac{1}{1}\right) + \left(\frac{50}{100} \times \frac{1}{2}\right) \quad (2b)$$
$$= 0.5 + 0.25$$
$$= 0.75$$

Figure 5C:
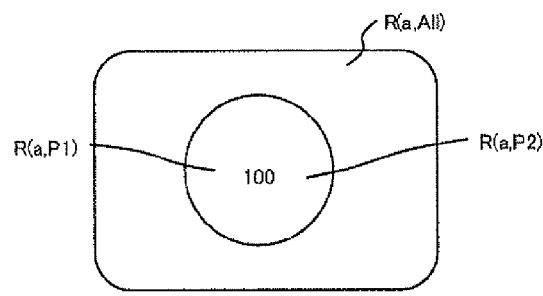

FIG. 5C shows an example in which the resource area allocatable for policy P1 and the resource area allocatable for policy P2 completely overlap. In the case of FIG. 5C, the adjustment coefficient of policy P1 on the storage device 1a is calculated as 0.5 by expression (2c) in which the actual numeric values are assigned to expression (1b).

$$\text{Adjustment coefficient}(a, P1) = \left(\frac{0}{100} \times \frac{1}{1}\right) + \left(\frac{100}{100} \times \frac{1}{2}\right) \quad (2c)$$
$$= 0 + 0.5$$
$$= 0.5$$

Figure 5D:
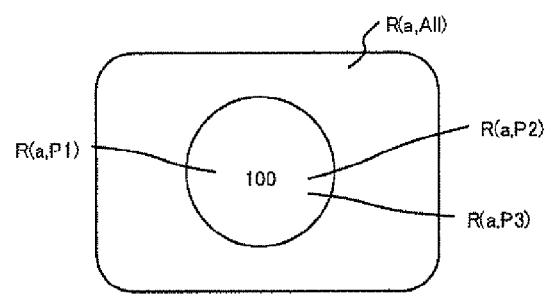

FIG. 5D shows an example in which the resource area allocatable for policy P1, the resource area allocatable for policy P2, and the resource area allocatable for policy P3 completely overlap. In the case of FIG. 5D, the adjustment coefficient of policy P1 on the storage device 1a calculated approximately as 0.33 by calculation expression (expression (2d)) in which the actual numeric values are assigned to expression (1b).

$$\text{Adjustment coefficient}(a, P1) = \left(\frac{0}{100} \times \frac{1}{1}\right) + \left(\frac{0}{100} \times \frac{1}{2}\right) + \quad (2d)$$
$$\left(\frac{100}{100} \times \frac{1}{3}\right)$$
$$\approx 0 + 0 + 0.33$$
$$= 0.33$$

Figure 5E:
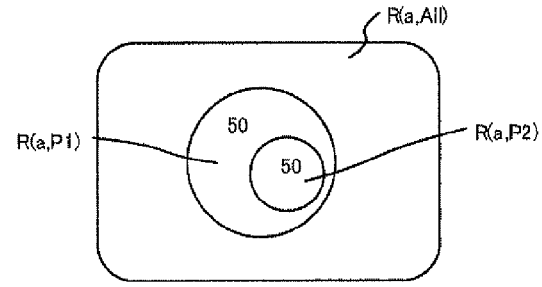

FIG. 5E shows an example in which the resource area allocatable for policy P1 completely includes the resource area allocatable for policy P2. In the case of FIG. 5E, the adjustment coefficient of policy P1 on the storage device 1a is calculated as 0.75 by expression (2e1) in which the actual numeric values are assigned to expression (1b).

$$\text{Adjustment coefficient}(a, P1) = \left(\frac{50}{100} \times \frac{1}{1}\right) + \left(\frac{50}{100} \times \frac{1}{2}\right) \quad (2e1)$$
$$= 0.5 + 0.25$$
$$= 0.75$$

The adjustment coefficient of policy P2 on the storage device 1a is calculated as 0.5 by expression (2e2) in which the actual numeric values are assigned to expression (1b).

$$\text{Adjustment coefficient}(a, P2) = \left(\frac{0}{50} \times \frac{1}{1}\right) + \left(\frac{50}{50} \times \frac{1}{2}\right) \quad (2e2)$$
$$= 0 + 0.5$$
$$= 0.5$$

In FIGS. 5A, 5B, and 5C, the adjustment coefficients of policy P1 on the storage device 1a are 1, 0.75, and 0.5, respectively, and the amount of the area resource allocatable for policy P1 is 100 for all policies. Those adjustment coefficients indicate that the larger the overlapping area between the area allocatable for policy P1 and the area allocatable policy P2 is, the smaller the adjustment coefficient is.

In FIGS. 5C and 5D, the adjustment coefficients of policy P1 on the storage device 1a are 0.5 and about 0.33, respectively. Those adjustment coefficients indicate that the more the number of overlapping policies is, the smaller the adjustment coefficient is.

In FIG. 5E, the adjustment coefficient of policy P1 on the storage device 1a and the adjustment coefficient of policy P2 on the storage device 1a are 0.75 and 1, respectively. Those adjustment coefficients indicate that the adjustment coefficients are different among policies even if the policies are used on the same storage device.

The calculation expression used in the present invention is not limited to expressions in (1a) and (1b). Other calculation expressions may also be used that produce a smaller determination index as the number of overlapping policies, gets larger (that is, the resource sharability gets higher).

For example, the determination index may also be calculated by the expression shown by expression (3a1) in which the allocatable logical capacity is divided by all logical capacity including the allocated area and the result is multiplied by the adjustment coefficient.

$$\underset{\text{index}}{\text{Determination}}(k, n) = \frac{\text{Allocatable logical capacity}(k, n)}{\text{All logical capacity}(k)} \times \text{Adjustment coefficient}(k, n) \quad (3a1)$$

The determination index may also be calculated by the expression, shown as expression (3a2), in which the allocatable logical capacity remaining after allocating the requested capacity is multiplied by the adjustment coefficient.

Determination index$(k,n)$=Allocatable logical capacity after allocation$(k,n)$×Adjustment coefficient$(k,n)$ (3a2)

As shown in expression (3b1), the expression for calculating the adjustment coefficient may include p-th (p is an integer) power of the inverse number of the sharability degree m, instead of the inverse number of the sharability degree m used in expression (1b).

$$\text{Adjustment coefficient}(k, n) = \sum_m \left( \frac{\substack{\text{Amount of resources allocatable for} \\ \text{policy } n \text{ and with sharability degree of } m}}{\substack{\text{Amount of resources} \\ \text{allocatable for policy } n}} \times \frac{1}{m^p} \right) \quad (3b1)$$

Note that adjustment coefficient (k,n)=1 when the amount of resources allocatable for policy n is 0.

The larger the value of p is, the higher the degree with which the determination index gets lower when the resource sharability degree is high. In addition, when p=∞ and the resource sharability is larger than 1, the adjustment coefficient may be 0. The calculation expression may be changed according to the system configuration or the operation guideline.

Figure 3:
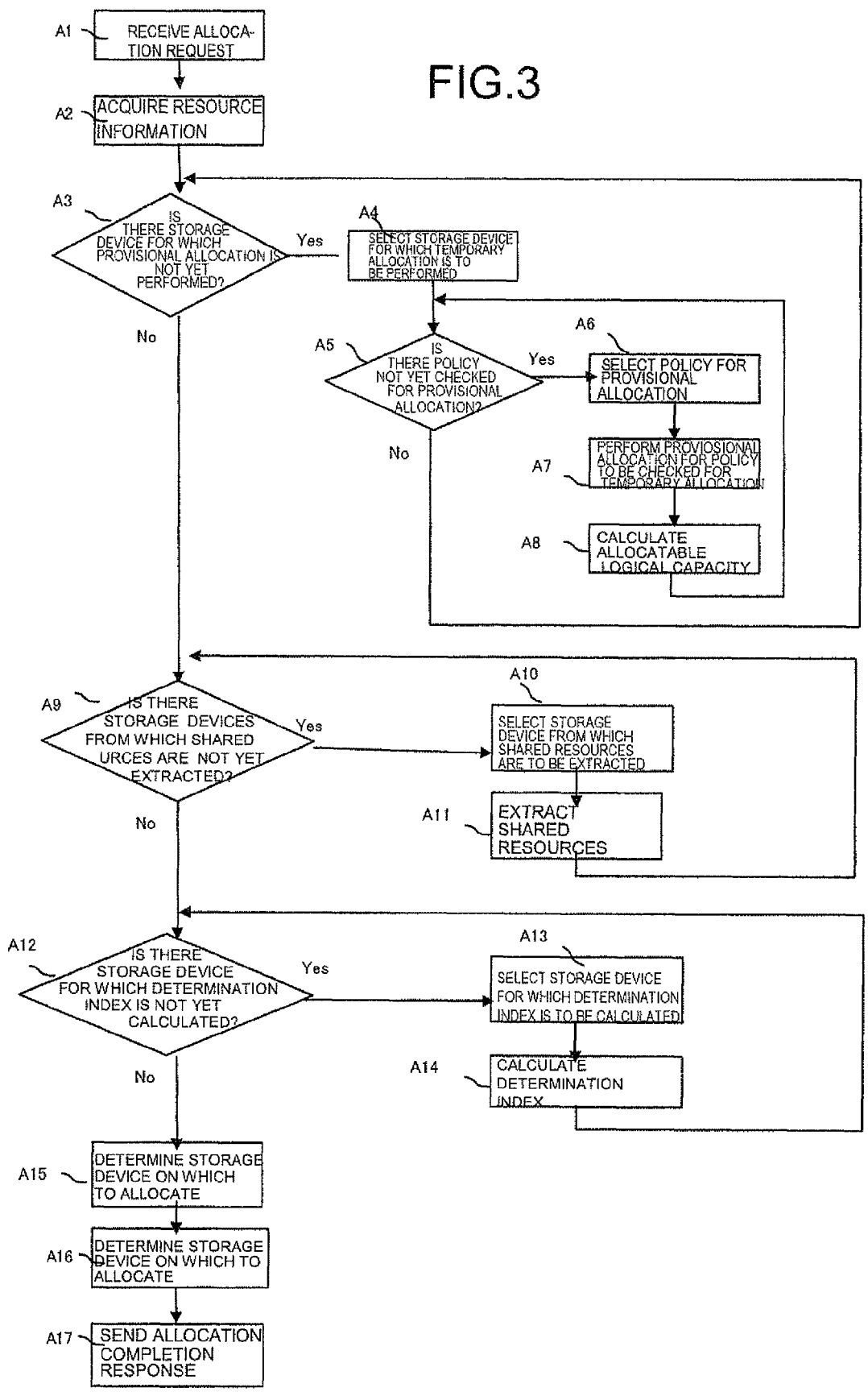
FIG. 3 is a flowchart showing the operation of the first example of the present invention.

Next, the following describes the operation of this example in detail with reference to the flowchart in FIG. 3. FIG. 3 is a flowchart showing the operation from the time the management server 3 receives an allocation request from the requesting device 4 to the time the allocation is completed.

Assume that one or more policies are stored in the policy storage unit 321 in advance from the console 5 via the console communication unit 332 and the policy setting unit 318.

First, when the request processing unit 311 receives an allocation request from the requesting device 4 via the requesting device communication unit 331 (step A1), the resource information collection unit 312 acquires resource information from all connected storage devices 1 via the storage communication unit 333 and the management network 92 and stores the acquired resource information in the resource information storage unit 322 (step A2).

Next, the provisional allocation execution unit 313 determines if there is one or more storage devices 1 for which provisional allocation is not yet performed (step A3).

If there is one or more storage devices 1 for which provisional allocation is not yet performed, the provisional allocation execution unit 313 selects one of such storage devices 1 as the storage device 1 for which provisional allocation is to be performed (step A4).

Next, the provisional allocation execution unit 313 determines if there is a policy, not yet checked for provisional allocation, for the selected storage device 1 (step A5).

If there is one or more policies not yet checked for provisional allocation, the provisional allocation execution unit 313 selects one of such policies as a policy for provisional allocation (step A6).

Next, the provisional allocation execution unit 313 executes provisional allocation for the selected policy to be checked against the storage device 1 for provisional allocation based on the resource information stored in the resource information storage unit 322 and stores the setting information, generated as a result of the provisional allocation, in the provisional allocation information storage unit 323 (step A7)

Next, the provisional allocation execution unit 313 calculates the logical capacity that can be allocated when the provisional allocation is performed, stores the calculated logical capacity in the provisional allocation information storage unit 323 (step A8), and passes control back to step A5.

Note that step A8 may be omitted for a policy other than that specified for the allocation request.

In step A5, if there is no policy not yet checked against the selected storage device 1 for provisional allocation, the provisional allocation execution unit 313 passes control back to step A3.

In step A3, if there is no storage device 1 for which provisional allocation is not yet performed, the shared resource extraction unit 314 determines if there is one or more storage devices 1 from which shared resources are not yet extracted (step A9).

If there is one or more storage devices 1 from which the shared resources are not yet extracted, the shared resource extraction unit 314 selects one of such storage devices 1 as the storage device from which shared resources are to be extracted (step A10).

Next, the shared resource extraction unit 314 extracts the shared resources from the selected storage device 1 based on the provisional allocation information stored in the provisional allocation information storage unit 323, stores the shared resource information in the shared resource information storage unit 324 (step A11), and passes control back to step A9.

In step A9, if there is no storage device 1 from which the shared resources are not yet extracted, the determination index calculation unit 315 determines if there is one or more storage devices 1 for which the determination index is not yet calculated (step A12).

If there is one or more storage devices 1 for which the determination index is not yet calculated, the determination index calculation unit 315 selects one of such storage devices as the storage device 1 for which the determination index is to be calculated (step A13)

Next, the determination index calculation unit 315 calculates the determination index for the selected storage device 1 based on the logical capacity stored in the provisional allocation information storage unit 323 and the shared resource information stored in the shared resource information storage unit 324, stores the calculated determination index in the determination index storage unit 325 (step A14), and passes control back to step A12.

In step A12, if there is no storage device 1 for which the determination index is not yet calculated, the determination unit 316 compares the determination indexes stored in the determination index storage unit 325 and determines the storage device on which the requested storage area is to be allocated (step A15).

Next, the allocation instruction unit 317 sends an allocation instruction to the storage device, on which the storage area is determined to be allocated, via the storage communication unit 333 and the management network 92 (step A16).

When the allocation is completed, the request processing unit 311 sends the allocation completion response to the requesting device 4 via the requesting device communication unit 331 (step A17).

The operation described with reference to FIG. 3 allows a storage area to be allocated considering the resource sharability among policies.

Although a determination index is calculated in this example after the management server 3 receives an allocation request, it is also possible that a determination index is calculated in advance for all or a part of policies. In this case, the management server 3 confirms the resource information on all storage devices 1 after receiving an allocation request and re-calculates the determination indexes only for the storage devices 1 whose resource information is changed from the time the determination index was calculated in advance, thus reducing the time to the completion of allocation.

In the example described above, if the allocation configuration, in which the maximum capacity can be allocated, is not determined uniquely for a combination of one storage device 1 and one policy when the provisional allocation execution unit 313 performs provisional allocation, one allocation configuration is selected from two or more allocation configurations in which the maximum capacity can be allocated. Instead of this method, it is also possible that the determination indexes are calculated for two or more allocation configurations and, from those allocation configurations, the allocation configuration in which the determination index is the maximum is selected.

The effect of this example is as follows.

In this example, the allocation of a storage area is determined considering the resource sharability among policies. So, this example can reduce the generation of a condition in which, when there are multiple storage area allocation policies and storage area allocation requests are issued one after another, a storage area cannot sometimes be allocated to a request in spite of the fact that a storage area could be allocated to that request if an earlier allocation request was allocated to some other resources. It should be noted that the inverse number of expression (1a), (3a1), or (3a2) may also be used as the determination index. In this case, the lower the resource sharability is, the smaller the value of the determination index is.

SECOND EXAMPLE

Next, a second example of the present invention will be described. The system configuration of the second example of the present invention is similar to the system configuration of the first example shown in FIG. I except the configuration of a storage device 1, the configuration of a management server 3, and the sequence of operation in the first example.

The following describes the difference between the second example and the first example of the present invention.

Figure 6:
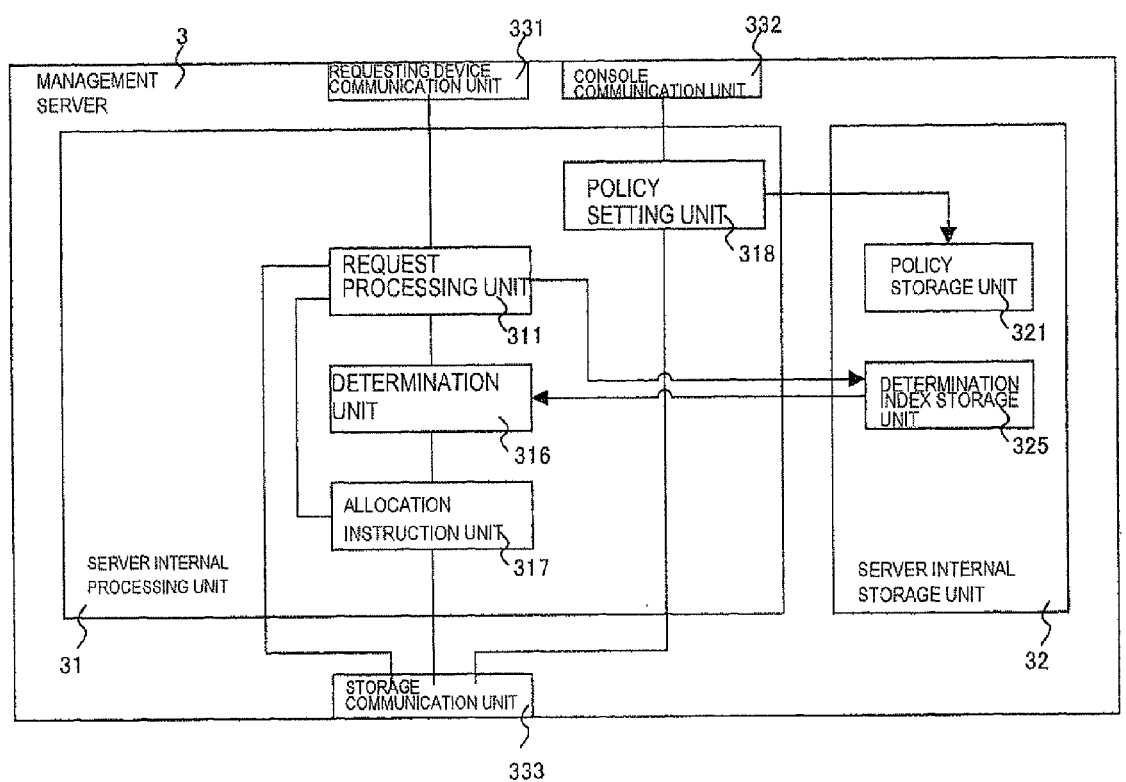
FIG. 6 is a block diagram showing the detail of a management server 3 in the second example of the present invention.

FIG. 6 is a diagram showing the configuration of the management server 3. Referring to FIG. 6, the management server 3 in this example comprises a server internal processing unit 31, a server internal storage unit 32, a requesting device communication unit 331, a console communication unit 332, and a storage communication unit 333.

The server internal processing unit 31 comprises a request processing unit 311, a determination unit 316, an allocation instruction unit 317, and a policy setting unit 318.

The request processing unit 311 receives a request, entered from the requesting device 4 via the requesting device communication unit 331, and sends a determination index request to all storage devices 1 via the storage communication unit 333 and a management network 92. In addition, when a determination index is received from the storage device 1, the request processing unit 311 stores the received determination index in a determination index storage unit 325. When allocation processing is completed, the request processing unit 311 sends an allocation completion response to a requesting device 4 via the requesting device communication unit 331.

The determination unit 316 compares the determination indexes of the storage devices 1 stored in the determination index storage unit 325 to determine the storage device 1 to which a storage area is to be allocated.

The allocation instruction unit 317 issues an allocation instruction to the storage device 1, to which a storage area is determined to be allocated, via the storage communication unit 333.

When an allocation execution completion notification is received from the storage device 1, the allocation instruction unit 317 instructs the request processing unit 311 to send the allocation completion response to the requesting device 4.

The policy setting unit 318 stores a policy, entered from the console 5 via the console communication unit 332, into a policy storage unit 321, and sends the entered policy to all storage devices 1 via the storage communication unit 333 and management network 92.

When a request to change or delete a defined policy is received from the console 5, the policy setting unit 318 changes or deletes policy information, stored in the policy storage unit 321, according to the request, and sends the request to change or delete to all storage devices 1 via the storage communication unit 333 and the management network 92.

The server internal storage unit 32 comprises the policy storage unit 321 and the determination index storage unit 325.

The policy storage unit 321 stores policy information.

The determination index storage unit 325 stores determination indexes.

The requesting device communication unit 331 communicates with the requesting device 4.

The console communication unit 332 communicates with the console 5.

The storage communication unit 333 communicates with the storage devices 1 via the management network 92.

Figure 7:
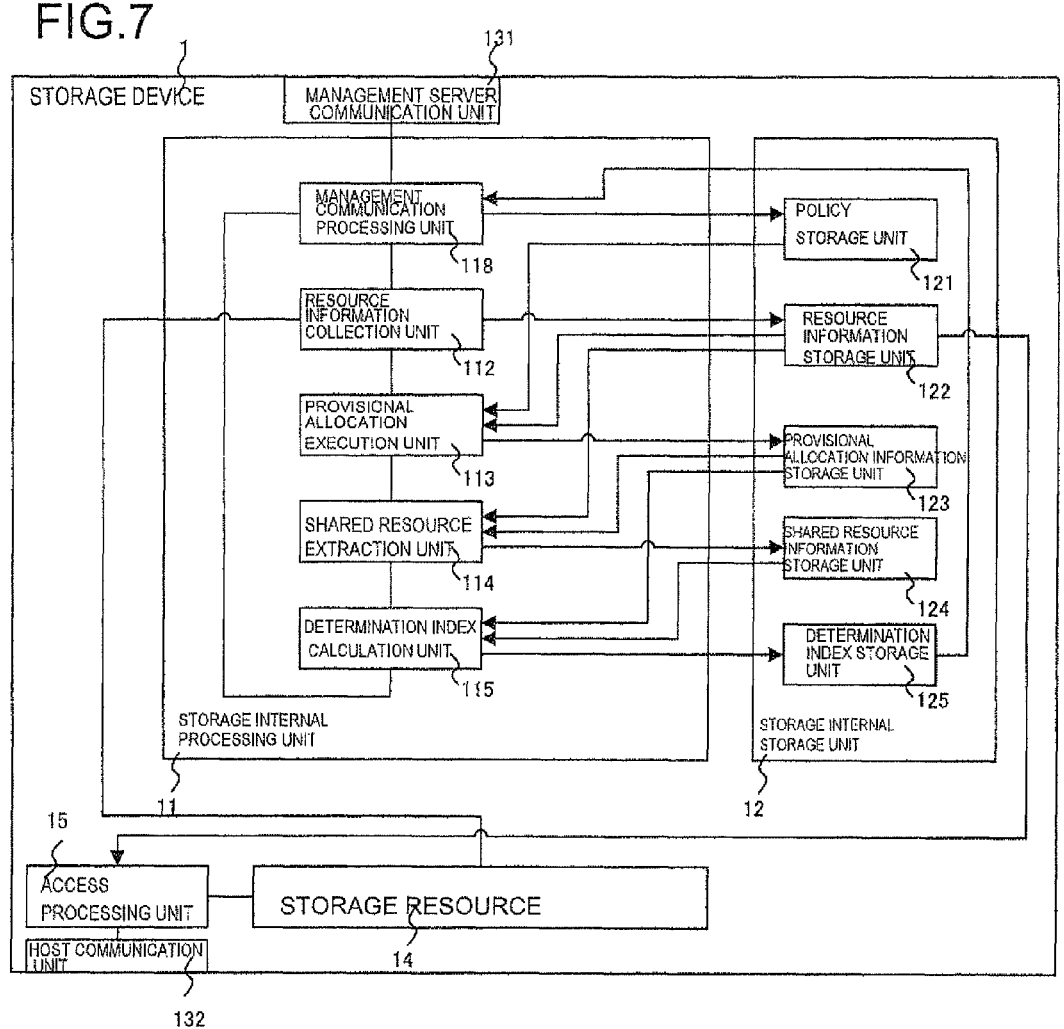
FIG. 7 is a block diagram showing the detail of a storage device 1 in the second example of the present invention.

Referring to FIG. 7, the storage device 1 in this example comprises a storage internal processing unit 11, a storage internal storage unit 12, a management server communication unit 131, a host communication unit 132, a storage resource 14, and an access processing unit 15.

The storage internal processing unit 11 comprises a resource information collection unit 112, a provisional allocation execution unit 113, a shared resource extraction unit 114, a determination index calculation unit 115, and a management communication processing unit 118.

The resource information collection unit 112 collects resource information on its own storage device 1 and stores the collected information in a resource information storage unit 122. When the setting is changed, for example, in the physical resource configuration or the logical unit allocation status, the resource information collection unit 112 changes the setting information stored in the resource information storage unit 122.

The provisional allocation execution unit 113 derives an allocation configuration in which the maximum capacity of the storage area that satisfies a specific policy based on the resource information stored in the resource information storage unit 122 and the policy information stored in a policy storage unit 121 (hereinafter, this processing is called "provisional allocation"), and stores the derived allocation configuration in a provisional allocation information storage unit 123.

The provisional allocation execution unit 113 also calculates the logical capacity when the provisional allocation is performed and stores the calculated logical capacity in the provisional allocation information storage unit 123 (hereinafter the information stored in the provisional allocation information storage unit 123 is called "provisional allocation information").

The provisional allocation execution unit 113 performs provisional allocation for all policies.

The allocation configuration in which the maximum capacity can be allocated for one policy is not sometimes determined uniquely. In this case, it is desirable to derive multiple allocation configurations in which the maximum capacity can be allocated and, after that, select the combination that maximizes the determination index that will be described later.

It should be noted that the effect of the present invention can be achieved also by selecting any one of allocation configurations in which the maximum capacity can be allocated. For a policy other than the policy specified by the allocation request, the logical capacity need not be calculated at provisional allocation time nor need the logical capacity be stored in the provisional allocation information storage unit 123.

The operation of the provisional allocation execution unit 113 is almost the same as that of the provisional allocation execution unit 313 in the first example described above except that the provisional allocation execution unit 113 performs provisional allocation only for its own storage device 1.

The shared resource extraction unit 114 extracts resources sharable between the policies when resources are temporarily allocated for the policies based on the information stored in the resource information storage unit 122 and the provisional allocation information storage unit 123, and stores the information on the extracted shared resources in a shared resource information storage unit 124 (hereinafter, this processing is called "shared resource extraction").

The operation of the shared resource extraction unit 114 is almost the same as that of the shared resource extraction unit 314 in the first example except that the shared resource extraction unit 114 performs shared resource extraction only for its own storage device 1.

The determination index calculation unit 115 calculates a determination index based on the logical capacity stored in the provisional allocation information storage unit 123 and the information stored in the shared resource information storage unit 124 and stores the calculated determination index in a determination index storage unit 125.

The operation of the determination index calculation unit 115 is almost the same as that of the determination index calculation unit 315 in the first example described above except that the determination index calculation unit 115 performs determination index calculation only for its own storage device 1.

The management communication processing unit 118 interprets the communication content received from the management server 3 via the management network 92 and the management server communication unit 131.

When the communication content is a request to input, change, or delete a policy, the management communication processing unit 118 adds, changes, or deletes the policy information in the policy storage unit 121 according to the request.

When the communication content is a request to calculate a determination index, the management communication processing unit 118 starts the determination index calculation processing.

When the determination index calculation processing is finished, the management communication processing unit 118 sends the determination index to the management server 3 via the management server communication unit 131 and the management network 92.

The storage internal storage unit 12 comprises the policy storage unit 121, resource information storage unit 122, provisional allocation information storage unit 123, shared resource information storage unit 124, and determination index storage unit 125.

The policy storage unit 121 stores the policy information.

The resource information storage unit 122 stores the resource information. The resource information stored in the resource information storage unit 122 is almost the same as that stored in the resource information storage unit 322 in the first example except that the resource information only on its own storage device 1 is stored.

The provisional allocation information storage unit 123 stores the provisional allocation information.

The provisional allocation information stored in the provisional allocation information storage unit 123 is almost the same as that stored in the provisional allocation information storage unit 323 in the first example described above except that the provisional allocation information only on its own storage device 1 is stored.

The shared resource information storage unit 124 stores the shared resource information.

The shared resource information stored in the shared resource information storage unit 124 is almost the same as that stored in the shared resource information storage unit 324 in the first example except that the shared resource information only on its own storage device 1 is stored.

The determination index storage unit 125 stores the determination index.

The determination index stored in the determination index storage unit 125 is almost the same as those stored in the determination index storage unit 325 in the first example except that the determination index only on its own storage device 1 is stored.

The management server communication unit 131 communicates with the management server 3 via the management network 92.

The host communication unit 132 communicates with a host 2 via a SAN 91.

The storage resource 14, a physical component for implementing storage, is HDDs, a cache memory, and so on.

The access processing unit 15 sends and receives data between the storage resource 14 and the host 2 according to an access request received from the host 2 via the SAN 91 and the host communication unit 132.

The access processing unit 15 determines a storage resource to be actually accessed based on the setting information stored in the resource information storage unit 122.

For example, if the storage resource 14 comprises multiple HDDs and if multiple logical units are built on a RAID composed of multiple HDDs, the access processing unit 15 performs address conversion between a logical unit name and an address, requested by the host 2, and an HDD and an address on the HDD to be physically accessed.

Figure 8:
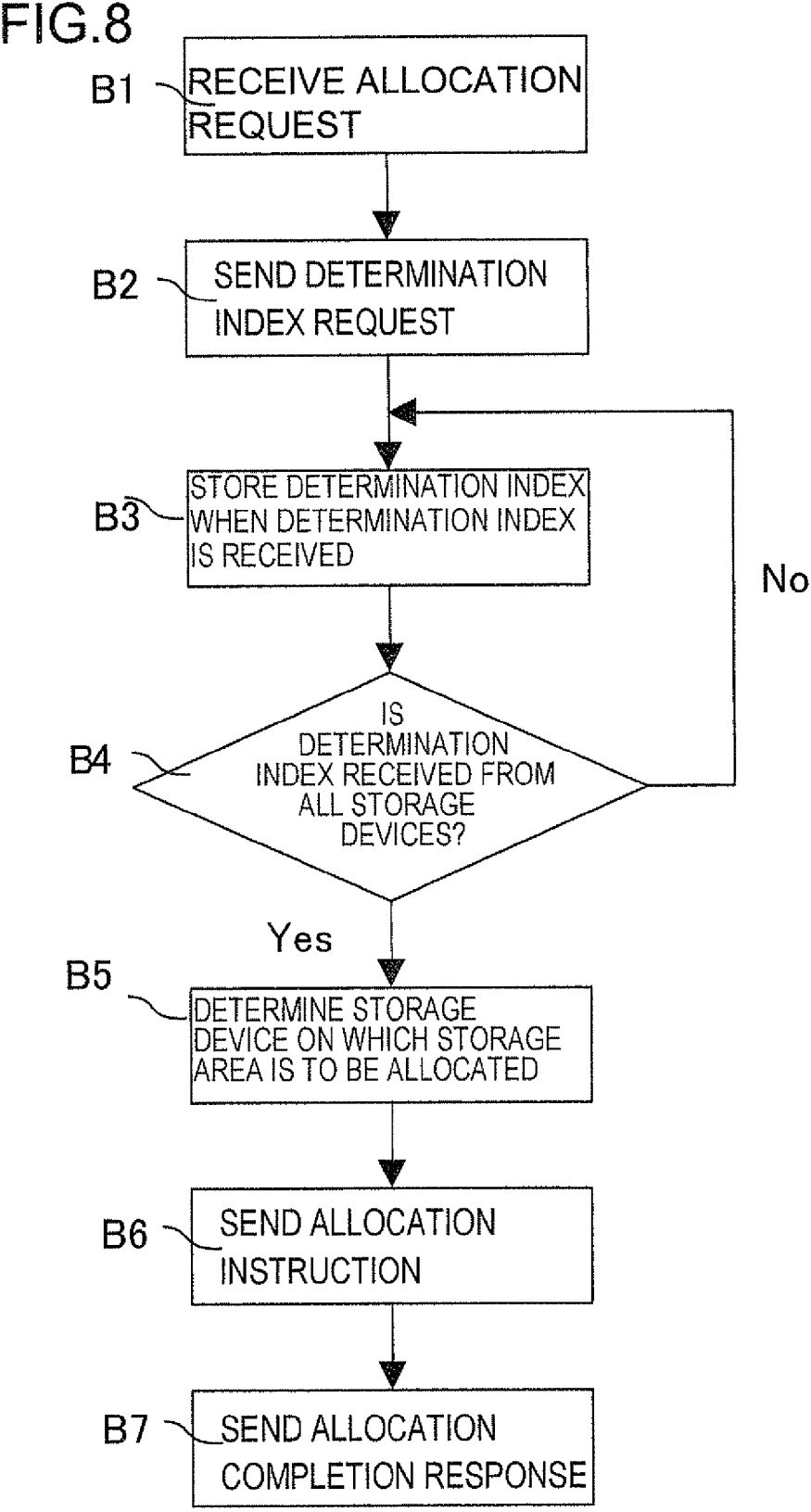
FIG. 8 is a flowchart showing the operation of the second example of the present invention.
Figure 9:
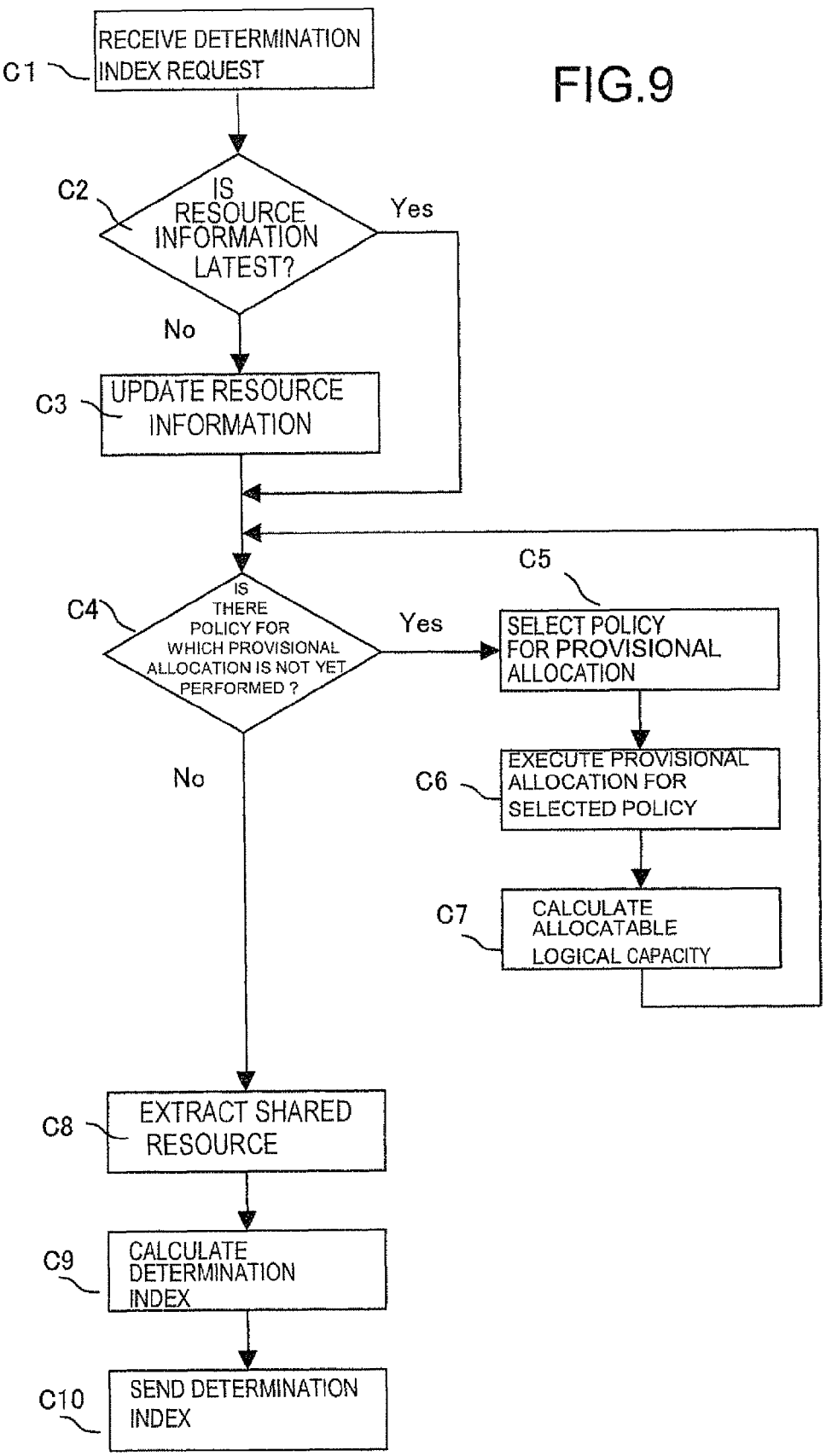
FIG. 9 is a flowchart showing the operation of the second example of the present invention.

Next, the following describes the operation of this example in detail with reference to the flowcharts in FIG. 8 and FIG. 9.

FIG. 8 is a flowchart showing the operation of the management server 3 from the time the management server 3 receives an allocation request from the requesting device 4 to the time the allocation is completed.

Assume that one or more policies are stored in advance in the policy storage unit 321 from the console 5 via the console communication unit 332 and the policy setting unit 318.

First, when the request processing unit 311 receives an allocation request from the requesting device 4 via the requesting device communication unit 331 (step B1), the request processing unit 311 sends a determination index request to all storage devices 1 via the storage communication unit 333 and the management network 92 (step B2).

Next, the request processing unit 311 waits for a determination index to be sent from each storage device 1 and, when a determination index is received from the storage device 1, stores the received determination index in the determination index storage unit 325 (step B3).

Next, the request processing unit 311 determines if determination indexes are received from all storage devices (step B4).

If determination indexes are not received from all storage devices in step B4, control is passed back to step B3.

If determination indexes are received from all storage devices in step B4, the determination unit 316 compares the determination indexes, stored in the determination index storage unit 325, to determine the storage device on which the storage area is to be allocated (step B5).

Next, the allocation instruction unit 317 sends an allocation instruction to the storage device, on which the storage area is determined to be allocated, via the storage communication unit 333 and the management network 92 (step B6).

When the allocation is completed, the request processing unit 311 sends an allocation completion response notification to the requesting device 4 via the requesting device communication unit 331 (step B7).

FIG. 9 is a flowchart showing the operation of the storage device 1 from the time the storage device 1 receives a determination index request from the management server 3 to the time the storage device 1 sends back the determination index.

Assume that one or more policies are stored in the policy storage unit 121 in advance from the management server 3 via the management network 92, management server communication unit 131, and management communication processing unit 118.

First, when the management communication processing unit 118 receives a determination index request from the management server 3 via the management network 92 and the management server communication unit 131 (step C1), the resource information collection unit 112 confirms if the information stored in the resource information storage unit 122 is the latest (step C2) and, if the information is not the latest, collects the resource information and updates the resource information stored in the resource information storage unit 122 (step C3).

Step C2 and step C3 are performed to reflect physical resource information updates when there is a physical resource addition or failure after storing the physical resource information before.

After step C3 is completed or if the resource information is the latest in step C2, the provisional allocation execution unit 113 determines if there is a policy for which provisional allocation is not yet executed (step C4).

If there is one or more policies for which provisional allocation is not yet executed, the provisional allocation execution unit 113 selects one of such policies as a policy for provisional allocation (step C5).

Next, the provisional allocation execution unit 113 executes provisional allocation for the selected policy based on the resource information stored in the resource information storage unit 122 and stores the setting information, generated as a result of the provisional allocation, in the provisional allocation information storage unit 123 (step C6).

Next, the provisional allocation execution unit 113 stores the logical capacity, which can be allocated when the provisional allocation is executed, in the provisional allocation information storage unit 123 (step C7) and passes control back to step C4. Note that step C7 may be omitted for a policy other than the one specified for the allocation request.

If, in step C4, there is no policy for which the provisional allocation is not yet executed, the shared resource extraction unit 114 performs shared resource extraction based on the provisional allocation information stored in the provisional allocation information storage unit 123 and stores the shared resource information in the shared resource information storage unit 124 (step C8).

Next, the determination index calculation unit 115 calculates the determination index based on the shared resource information, stored in the shared resource information storage unit 124, and stores the determination index in the determination index storage unit 125 (step C9).

Next, the management communication processing unit 118 sends the determination index, stored in the determination index storage unit 125, to the management server 3 via the management server communication unit 131 and the management network 92 (step C10).

The operation described with reference to FIG. 8 and FIG. 9 allows a storage area to be allocated considering the resource sharability among policies.

Although a determination index is calculated in this example after the storage device 1 receives a determination index request, it is also possible that a determination index is calculated in advance for all or a part of policies.

In this case, the storage device 1 confirms the resource information after receiving a determination index request and re-calculates the determination index only when the resource information is changed from the information existing at the time the determination index was calculated in advance. Thus, if there is no change in the resource information, the time to the transmission of the determination index can be reduced.

If there are two or more allocation configurations in which the maximum capacity can be allocation for one policy when the provisional allocation execution unit 113 executes the provisional allocation, any one of such allocation configurations is selected in this example. Instead of this method, it is also possible that the determination indexes are calculated for two or more allocation configurations and, from those allocation configurations, the allocation configuration in which the determination index is the maximum is selected.

The effect of this example is as follows.

This example achieves the effect of the first example and, in addition, the effect of reducing the load of the management server 3 because a determination index is calculated, not by the management server 3, but by each storage device 1.

In addition, the storage device 1 need not send resource information to the management server 3 but sends only a determination index whose information amount is smaller than that of the resource information to the management server 3, thereby achieving the effect of reducing the amount of communication on the management network 92. The following describes an example.

FIRST EXAMPLE

This example corresponds to the first example of the present invention. In this example, there are two storage devices, 1a and 1b, as the storage devices 1 shown in FIG. 1.

In this example, the resource on which a storage area is allocated is HDDs. Expression (1a) and expression (1b) are used as the expression for calculating the determination index used in this example.

The storage area allocation in this example is an operation in which a part of the logical address space of a RAID, composed of multiple HDDs, is allocated as a logical unit. If a RAID on which a logical unit can be allocated is not built, a new RAID is built and, after that, the logical unit is allocated thereon.

Figure 10A:
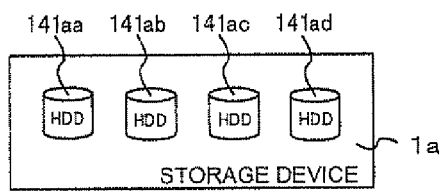
FIGS. 10A to 10F are block diagrams showing an example of storage devices in a first example of the present invention.
Figure 10B:
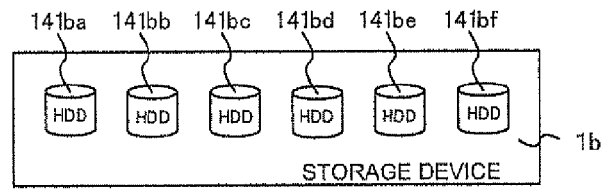

FIGS. 10A and 10B are diagram showing the HDDs of the storage device 1a and the storage device 1b, respectively.

The storage device 1a has four HDDs (HDD 141aa, HDD 141ab, HDD 141ac, HDD 141ad), and the storage device 1b has six HDDs (HDD 141ba, HDD 141bb, HDD 141bc, HDD 141bd, HDD 141be, HDD 141bf).

Each of all HDDs 141 has 100 GB of physical capacity. FIGS. 10A and 10B show the status in which neither RAIDs are set nor are logical units allocated.

FIG. 11 shows the status of the policy storage unit 321. Policy 1 having the condition that the RAID level is RAID1 and policy 2 having the condition that the RAID level is RAID5(5+P) are defined in the policy storage unit 321.

RAID1 has the configuration in which two HDDs are used in the mirroring mode.

RAID5(5+P), a RAID composed of 6 HDDs, has the configuration in which the parity of data stored on 5 HDDs in the striping mode is stored on the other one HDD.

The following describes the operation that is performed when a storage area allocation request (request 1) of "policy 1, 100 GB" is received from the requesting device 4 (step A1 in FIG. 3).

FIG. 12A shows the status of the resource information storage unit 322 after the resource information is acquired (step A2).

The resource information storage unit 322 has the areas in which the following are stored.

Physical resource information such as identifiers and physical capacities of HDDs owned by each storage device 1;

RAID setting information such as the identifiers, types, logical capacities, and used HDDs of RAIDs;

Logical unit setting information such as the identifiers, logical capacities, and used RAIDs of logical units FIG. 12A shows the status of the resource information storage unit 322 in which the identifiers and the physical capacities of the HDDs owned by storage devices 1a and 1b are stored but, because RAIDs and logical units are not yet built, the RAID setting information and the logical unit setting information are not stored Next, FIG. 13A shows the status of the provisional allocation information storage unit 323 after steps A3-A8 are executed.

The provisional allocation information storage unit 323 stores the status information after the provisional allocation of all policies is performed for each of the storage devices. After the provisional allocation is performed, the identifiers, types, logical capacities, and used HDDs of RAIDs as well as the identifiers, logical capacities, and used RAIDs of logical units are stored in the provisional allocation information storage unit 323.

The provisional allocation information storage unit 323 also stores the logical capacity for a policy specified by the request. In step A8 in this example, it is assumed that the calculation and the storage of the logical capacity of a policy other than that specified by the request are omitted.

FIG. 13A indicates that 200 GB can be allocated for policy 1, but no storage area for policy 2, on the storage device 1a.

The figure also indicates that the 300 GB can be allocated on the storage device 1b for policy 1 and that the storage device 1b has HDDs that can be allocated for policy 2.

The identifier of a RAID and the identifier of a logical unit in the provisional allocation information storage unit 323 are set temporarily at provisional allocation time.

Next, FIG. 14A shows the status of the shared resource information storage unit 324 after steps A9-A11 are executed.

The shared resource information storage unit 324 stores information on the HDDs of each storage device 1 that are temporarily allocated for a requested policy and that are temporarily allocated for the other policy.

FIG. 14A indicates that, on the storage device 1a, there is no HDD that is temporarily allocated for policy 1 and that is also temporarily allocated for policy 2 and that, on the storage device 1b, the HDDs that are temporarily allocated for policy 1 and that are temporarily allocated also for policy 2 are HDD 141ba, HDD 141bb, HDD 141bc, HDD 141bd, HDD 141be, and HDD 141bf.

Next, FIG. 15A shows the status of the determination index storage unit 325 after steps A12-A14 are executed.

The determination index storage unit 325 stores the value of the determination index of each storage device 1 calculated for the requested policy.

For the storage device 1a,
the allocatable logical capacity for policy 1 is 200 GB,
the physical capacity of HDDs allocatable for policy 1 is 400 GB (Sum of physical capacities of HDD 141aa, HDD 141ab, HDD 141ac, and HDD 141ad) and
the sharability degree is 1 because all HDDs allocatable for policy 1 are not temporarily allocated for the other policy.

Therefore, the adjustment coefficient is calculated as 1 (expression (4a1)), and the determination index is calculated as 200 GB (expression (4a2)).

$$\text{Adjustment coefficient}(a, 1) = \left(\frac{400}{400} \times \frac{1}{1}\right) = 1 \quad (4a1)$$

$$\text{Determination index}(a,1) = 200 \text{ GB} \times 1 = 200 \text{ GB} \quad (4a2)$$

For the storage device 1b,
the allocatable logical capacity for policy 1 is 300 GB,
the physical capacity of HDDs allocatable for policy 1 is 600 GB (Sum of physical capacities of HDD 141ba, HDD 141bb, HDD 141bc, HDD 141bd, HDD 141be, and HDD 141bf), and the sharability degree is 2 because all HDDs allocatable for policy 1 are temporarily allocated also for policy 2.

Therefore, the adjustment coefficient is calculated as 0.5 (expression (4a3)), and the determination index is calculated as 150 GB (expression (4a4)).

$$\text{Adjustment coefficient}(b, 1) = \left(\frac{0}{600} \times \frac{1}{1}\right) + \left(\frac{600}{600} \times \frac{1}{2}\right) \quad (4a3)$$
$$= 0 + 0.5$$
$$= 0.5$$

$$\text{Determination index}(b,1) = 300 \text{ GB} \times 0.5 = 150 \text{ GB} \quad (4a4)$$

So, in FIG. 15(a),

200 GB is stored as the determination index of storage device a and

150 GB is stored as the determination index of storage device b.

Next, in step A15, the storage device 1a with the larger determination index is determined as the allocation storage device, and the RAID is built and the logical unit is allocated (steps A16-A17).

The sharability degree of any HDD 141 in the storage device 1a is 1, any of the RAIDs created during provisional allocation may be built and the logical unit is allocated thereto.

In this example, the RAID is built using the HDD 141aa and the HDD 141ab and the logical unit is allocated thereto.

Figure 10C:
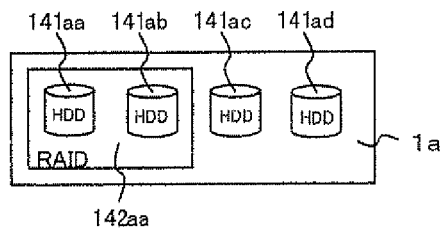
Figure 10D:
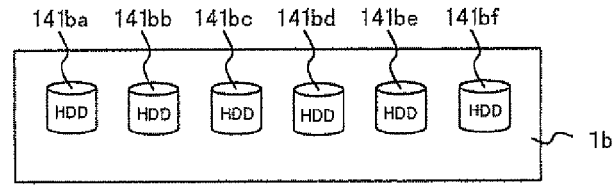

FIGS. 10C and 10D show the status of the storage device 1a and the storage device 1b at this time.

FIGS. 10C shows the status in which a RAID 142aa is configured using the HDD 141aa and the HDD 141ab in the storage device 1a.

Next, the following describes the operation that is performed when a storage area allocation request (request 2) of "policy 2, 500 GB" is received from the requesting device 4 (step A1 in FIG. 3).

FIG. 12B shows the status of the resource information storage unit 322 after the resource information is acquired (step A2). FIG. 12B shows the status in which RAID1 with the identifier aa and with the logical capacity of 100 GB is built using the HDD 141aa and HDD 141ab of the storage device 1a and, in the RAID with the identifier aa, the logical unit with the identifier LU0 and with the logical capacity of 100 GB is built.

Next, FIG. 13B shows the status of the provisional allocation information storage unit 323 after steps A3-A8 are executed.

FIG. 13B indicates that the storage device 1a has 0 GB of logical capacity allocatable for policy 2 and has HDDs allocatable for policy 1.

The figure also indicates that 500 GB of logical capacity can be allocated on the storage device 1b for policy 2 and that the storage device 1b has HDDs that can be allocated for policy 1.

FIG. 14B shows the status of the shared resource information storage unit 324 after steps A9-A11 are executed. FIG. 14B indicates that, on the storage device 1a, there is no HDD that is temporarily allocated for policy 2 and that is also temporarily allocated for policy 1 and that, on the storage device 1b, the HDDs that are temporarily allocated for policy 2 and that are temporarily allocated also for policy 1 are HDD 141ba, HDD 141bb, HDD 141bc, HDD 141bd, HDD 141be, and HDD 141bf.

FIG. 15B shows the status of the determination index storage unit 325 after steps A12-A14 are executed. On the storage device 1a, the allocatable logical capacity for policy 2 is 0 GB.

Therefore, the adjustment coefficient is calculated as 1 (expression (4b1)), and the determination index is calculated as 0 GB (expression (4b2)).

$$\text{Adjustment coefficient } (a,2)=1 \quad (4b1)$$

$$\text{Determination index}(a,2)=0 \text{ GB} \times 1 = 0 \text{ GB} \quad (4b2)$$

For the storage device 1b, the allocatable logical capacity for policy 2 is 500 GB, the physical capacity of HDDs allocatable for policy 2 is 600 GB (Sum of physical capacities of HDD 141ba, HDD 141bb, HDD 141bc, HDD 141bd, HDD 141be, and HDD 141bf), and the sharability degree is 2 because all HDDs allocatable for policy 2 are temporarily allocated also for policy 1.

Therefore, the adjustment coefficient is calculated as 0.5 (expression (4b3)), and the determination index is calculated as 250 GB (expression (4b4)).

$$\text{Adjustment coefficient}(b, 2) = \left(\frac{0}{600} \times \frac{1}{1}\right) + \left(\frac{600}{600} \times \frac{1}{2}\right) \quad (4b3)$$
$$= 0 + 0.5$$
$$= 0.5$$

$$\text{Determination index}(b,2) = 500 \text{ GB} \times 0.5 = 250 \text{ GB} \quad (4b4)$$

So, in FIG. 15(b), 0 GB is stored as the determination index of storage device a, and 250 GB is stored as the determination index of storage device b.

Next, in step A15, the storage device 1b with the larger determination index is determined as the allocation storage device, and the RAID is built and the logical unit is allocated (steps A16-A17).

Because the RAID is temporarily allocated on the storage device 1b only in one way, the RAID is built in the same way as when the RAID is temporarily allocated, and the logical unit is allocated.

Figure 10E:
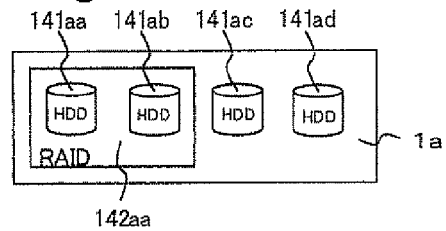
Figure 10F:
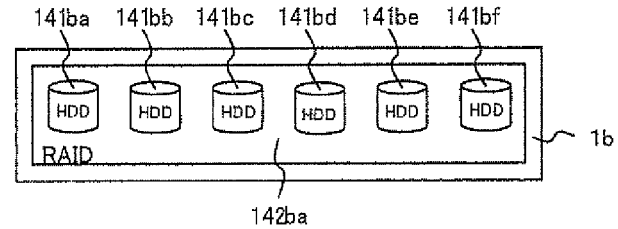

FIGS. 10E and 10F show the status of the storage device 1a and the storage device 1b at this time. FIGS. 10E and 10F shows the status in which the RAID 142aa is configured on the storage device 1a by the HDD 141aa and the HDD 141ab and the RAID 142ba is configured on the storage device 1b by the HDD 141ba, HDD 141bb, HDD 141bc, HDD 141bd, HDD 141be, and HDD 141bf.

FIG. 12C shows the status of the resource information storage unit 322 generated by the resource information acquisition operation (step A2) executed after the status shown in FIGS. 10E and 10F is generated.

The status shown in FIG. 12C is that, in addition to the status shown in FIG. 12B, RAID5(5+P) with the identifier ba is built by the HDD 141ba, HDD 141bb, HDD 141bc, HDD 141bd, HDD 141be, and HDD 141bf of the storage device 1b, and the logical unit with the identifier LU0 and with the logical capacity of 500 GB is built on the RAID with the identifier ba.

In the prior art technology in which the storage device 1 with the larger allocatable logical capacity is allocated for a requested policy as the allocation storage device, the storage area specified by request 1 is allocated on the storage device 1b that has the logical capacity allocatable for policy 1 and, as a result, the storage area specified by request 2 cannot be allocated.

That is, this example shows that the condition in which the HDD resource cannot be fully utilized can be avoided.

SECOND EXAMPLE

Next, the following describes the operation of the example of the present invention using another specific example. This example corresponds to the first example of the present invention.

In this example, there are two storage devices, storage device 1a and storage device 1b, as the storage device 1 shown in FIG. 1.

In this example, the resource on which a storage area is allocated is HDDs. In this example, p=2 is used in expressions (3a1) and (3b1) as the determination index calculation expression.

The storage area allocation in this example is the operation in which a part of the logical address space of a RAID, configured by multiple HDDs, is allocated as a logical unit.

If a RAID on which a logical unit can be allocated is not built, a new RAID is built and, after that, the logical unit is allocated thereon. If "None" is specified as the RAID level in the policy, a part of the physical address space of the HDDs is allocated as the logical unit.

If "None" is specified as the RAID level in the policy and the requested capacity exceeds the capacity of one HDD, the logical unit is allocated by concatenating the physical addresses of multiple HDDs.

This method is generally known as a logical concatenation.

Figure 16A:
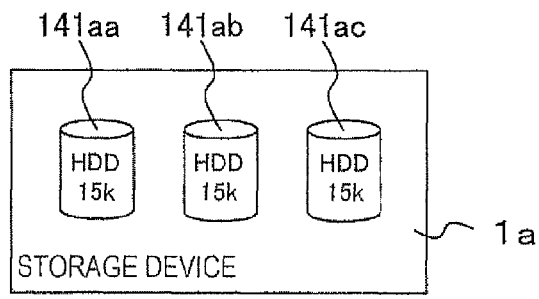
FIGS. 16A to 16F are block diagrams showing an example of a storage device in a second example of the present invention.

FIG. 16A is a diagram showing the HDDs of the storage device 1a and the storage device 1b. The storage device 1a comprises three HDDs (HDD 141aa, HDD 141ab, HDD 141ac), and the storage device 1b comprises two HDDs (HDD 141ba, HDD 141bb). Each of the HDDs 141 has the 100 GB of physical capacity.

In FIG. 16A, neither a RAID is set nor is a logical unit allocated.

The disk rotational speed of the HDD 141aa, HDD 141ab, and HDD 141ac of the storage device 1a is 15 krpm(15 kilo rotations per minute, i.e., 15000 rotations per minute) and that of the HDD 141ba and HDD 141bb of the storage device 1b is 10 krpm(10000 rotations per minute).

FIG. 17 is a diagram showing the status of the policy storage unit 321.

In the policy storage unit 321, the following are defined.

Policy 1 having the condition that no RAID level is specified (concatenate) and disk rotational speed is 10 krpm or higher and Policy 2 having the condition that no RAID level is specified (concatenate) and disk rotational speed is 15 krpm or higher.

The following describes an example in which a storage area allocation request (request 1) of "policy 1, 200 GB" is received from the requesting device 4 (step A1 in FIG. 3).

After the resource information acquisition in step A2 and the provisional allocation in steps A3-A8 are executed, all HDDs (HDD 141aa, HDD 141ab, and HDD 141ac) of the storage device 1a can be allocated for policy 1 with the allocatable capacity of 300 GB(sum of capacities of HDD 141aa, HDD 141ab, and HDD 141ac).

All HDDs (HDD 141aa, HDD 141ab, and HDD 141ac) of the storage device 1a can be allocated for policy 2 with the allocatable capacity of 300 GB(sum of capacities of HDD 141aa, HDD 141ab, and HDD 141ac).

All HDDs (HDD 141ba and HDD 141bb) of the storage device 1b can be allocated for policy 1 with the allocatable capacity of 200 GB(sum of capacities of HDD 141ba and HDD 141bb).

The storage device 1b has no HDD allocatable for policy 2.

In the resource information acquisition (step A2) in this example, the information is acquired from the storage device 1 and stored in the resource information storage unit 322 in the same way as in the resource information acquisition in the first example and, in addition, the disk rotational speed information on the HDDs 141 of each storage device 1 is acquired and stored in the resource information storage unit 322.

Next, the result of the shared resource extraction in steps A9-A11 indicates that the HDDs of the storage device 1a that are temporarily allocated for policy 1 and that are temporarily allocated also for policy 2 are HDD 141aa, HDD 141ab, and HDD 141ac.

The result of the shared resource extraction also indicates that there is no HDD of the storage device 1b that is temporarily allocated for policy 1 and that is temporarily allocated also for policy 2.

Next, in the determination index calculation in steps A12-A14, the determination index of the storage device 1a is calculated as 0.25 (expression (5a1) and expression (5a2)) and the determination index of the storage device 1b is calculated as 1 (expressions (5a3) and (5a4)).

$$\text{Adjustment coefficient}(a, 1) = \left(\frac{0}{300} \times \frac{1}{1^2}\right) + \left(\frac{300}{300} \times \frac{1}{2^2}\right) \quad (5a1)$$
$$= 0 + 0.25$$
$$= 0.25$$

$$\text{Determination index}(a, 1) = \frac{300\,\text{GB}}{300\,\text{GB}} \times 0.25 = 0.25 \quad (5a2)$$

$$\text{Adjustment coefficient}(b, 1) = \left(\frac{200}{200} \times \frac{1}{1^2}\right) = 1 \quad (5a3)$$

$$\text{Determination index}(b, 1) = \frac{200\,\text{GB}}{200\,\text{GB}} \times 1 = 1 \quad (5a4)$$

Thus, the storage device 1b with the larger determination index is determined as the storage device on which the storage area is to be allocated, and the logical disk is allocated thereon (steps A15-A17).

Figure 16B:
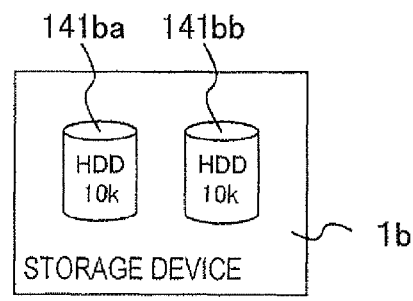

FIG. 16B is a diagram showing that a logical unit 143ba is allocated on the HDD 141ba and HDD 141bb of the storage device 1b.

Next, the following describes an example in which the storage area allocation request (request 2) of "policy 2, 200 GB" is received from the requesting device 4 (step A1).

Steps A2-A14 are executed in the same way as for request 1, and the determination indexes are calculated as follows.

0.25 (expressions (5b1) and (5b2)) as the determination index of storage device 1a and 0 (expressions (5b3) and (5b4)) as the determination index of storage device 1b $$\text{Adjustment coefficient}(a, 2) = \left(\frac{0}{300} \times \frac{1}{1^2}\right) + \left(\frac{300}{300} \times \frac{1}{2^2}\right) \quad (5b1)$$
$$= 0 + 0.25$$
$$= 0.25$$

$$\text{Determination index}(a, 2) = \frac{300\,\text{GB}}{300\,\text{GB}} \times 0.25 = 0.25 \quad (5b2)$$

-continued $$\text{Adjustment coefficient}(b, 2) = 1 \quad (5b3)$$

$$\text{Determination index}(b, 2) = \frac{0 \text{ GB}}{200 \text{ GB}} \times 1 = 0 \quad (5b4)$$

Thus, the storage device 1a with the larger determination index is determined as the storage device on which the storage area is to be allocated, and the logical disk is allocated thereon (steps A15-A17).

Figure 16C:
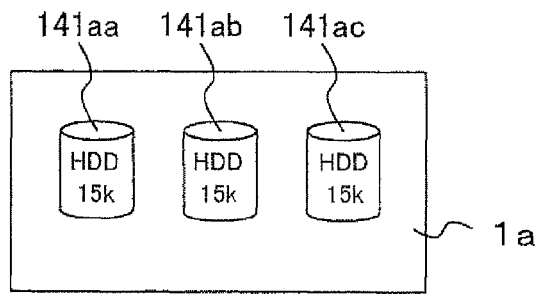
Figure 16D:
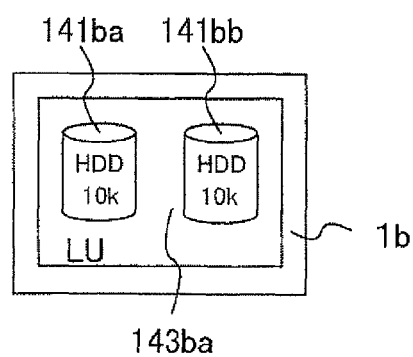
Figure 16E:
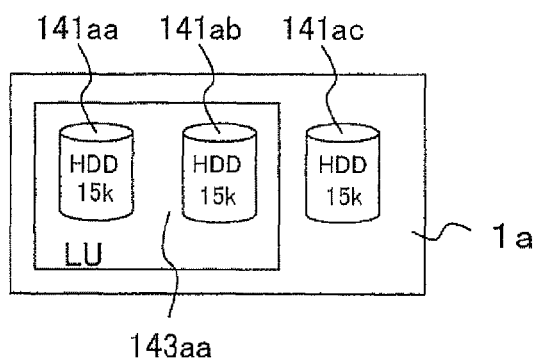
Figure 16F:
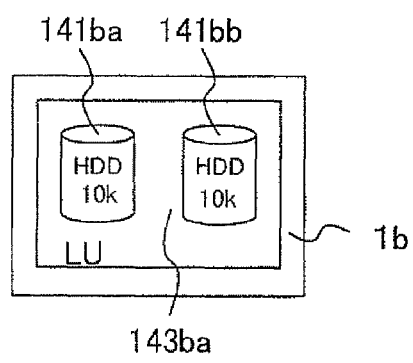

FIG. 16C is a diagram showing that a logical unit 143aa is allocated on the HDD 141aa and HDD 141ab of the storage device 1a.

In the prior art technology in which the storage device 1 with the larger allocatable logical capacity is allocated for a requested policy as the allocation storage device, the storage area specified by request 1 is allocated on the storage device 1a that has the logical capacity allocatable for policy 1 and, as a result, the storage area specified by request 2 cannot be allocated. That is, this example shows that the condition in which the HDD resource cannot be fully utilized can be avoided.

Although the allocation of a storage area on a storage device has been described in the examples described above, the present invention is, of course, not limited to that configuration. The examples in which the present invention is applied to resources other than a storage area on a storage device will be described. Like a storage area on a storage device, the resources in the examples described below, once allocated, are impossible or difficult to be rearranged (reallocated). It should be noted, however, that a resource such as a storage area in the main memory can be dynamically allocated to a process (task) via dynamic reallocation and, so, the resource allocation basically applicable to the static allocation (described in the examples given below) is not suitable for a resource that can be dynamically allocated.

THIRD EXAMPLE

Figure 18:
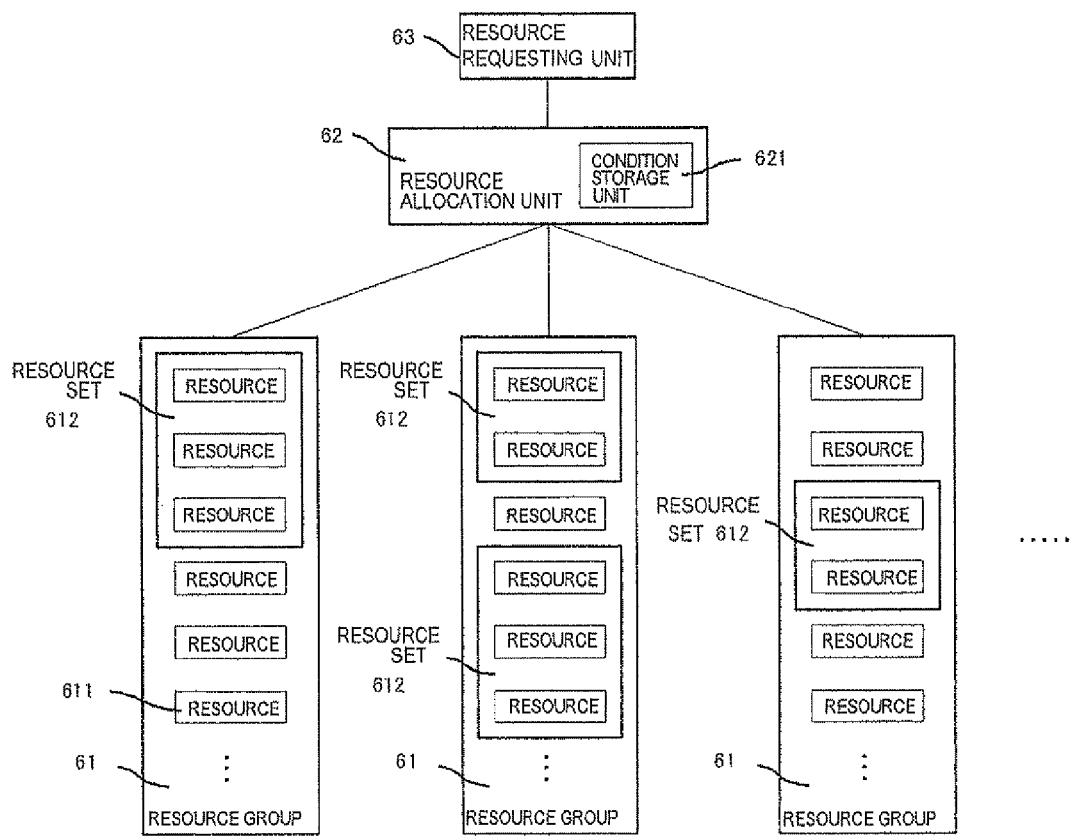
FIG. 18 is a diagram showing a third example of the present invention.
Figure 20A:
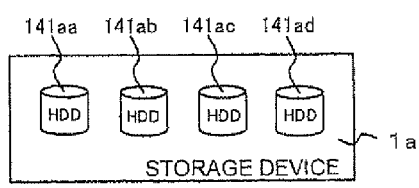
FIGS. 20A to 20D are block diagrams showing storage devices.
Figure 20B:
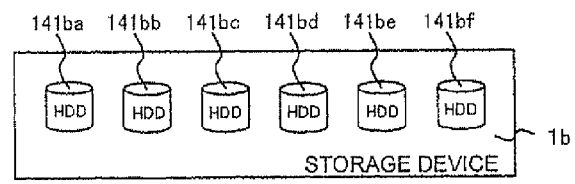
Figure 20C:
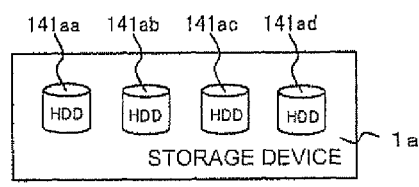
Figure 20D:
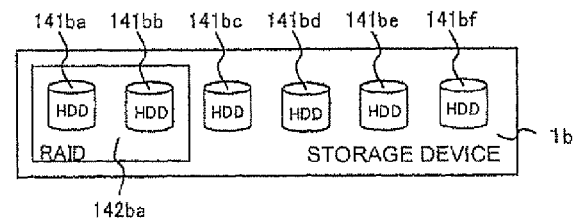

FIG. 18 is a diagram showing the configuration of a system in a third example of the present invention. Referring to FIG. 18, the system in the third example of the present invention comprises multiple resource groups 61, a resource allocation unit 62, and a resource requesting unit 63. Each resource group 61 comprises multiple resources 611. The resource 611 is the minimum unit of resource allocation. For example, the resource 611 may be a physical unit such as a server or a communication line or may be a performance allocation unit such as a channel used in the time-division multiplex (TDM), a wavelength used in a wavelength division multiplex (WDM), or a link used in a link aggregation. Those resources are allocated all exclusively.

The resources 611 may have different characteristics. For example, when the resource 611 is a server, the servers may have specifications different with each other.

A resource set 612 is a combination (set) of one or more resources 611 in the resource group 61.

One resource 611 may belong only to one resource set 612 (cannot belong to two different resource sets). So, the resource 611 that is already allocated to the resource set 612 cannot be allocated to another new resource set 612.

The resource allocation unit 62 performs resource allocation according to a request from the resource requesting unit 63. The resource allocation is performed in such a way that one or more resources 611 are allocated to the resource set 612 so that the resource amount and the condition requested by the resource requesting unit 63 are satisfied and, after that, the setting information on the resource set 612 (information on the resources belonging to the resource set to which the resources are allocated) is provided to the resource requesting unit 63.

The resource allocation unit 62 has a condition storage unit 621. The condition storage unit 621 stores resource allocation conditions as policies.

The resource requesting unit 63 requests the resource allocation unit 62 to allocate resources. A resource allocation request specifies a requested resource amount and a policy. The policy is selected from those stored in the condition storage unit 621.

In this example, the resource allocation unit 62 determines the resource group 61, to which resources are allocated, and the resources that are allocated to the resource set 612 with consideration for resource sharability between policies. For example, resources with a low sharability degree may be allocated using the adjustment coefficient and the determination index calculated by expressions (1b) and (1a) described above. The identification number k of the storage device in expressions (1b) and (1a) corresponds to the identification number k of the resource group 61, and the allocatable logical capacity (k,n) corresponds to the allocatable resource amount (k,n).

This example achieves the effect of reducing the generation of a condition in which, when resource allocation requests are issued one after another, a resource cannot be allocated to a request in spite of the fact that a resource could be allocated to that request if an earlier allocation request was allocated to some other resource, because an allocation destination is determined considering resource sharability among policies.

FOURTH EXAMPLE

FIG. 19 is a diagram showing the configuration of a system in a fourth example of the present invention. Referring to FIG. 19, this example has divisible resources 71 instead of the resource groups 61 in the third example shown in FIG. 18.

The divisible resource 71 can have its part of the area allocated to a resource division 712. One resource area can belong only to one resource division 712. That is, an area of the divisible resource 71 already allocated to the resource division 712 cannot be allocated newly to the resource division 712.

Although the example is not limited thereto, the divisible resource 71 may be divided to create a continuously area (continuous amount) that can be allocated to the resource division 712. Of course, the divisible resource 71 may be divided to create discrete areas that can be allocated to the resource division 712. In an information processing system, the divisible resource 71 is, for example, a memory.

In this example, the resource allocation refers to an operation that allocates a part of the area of the divisible resource 71 to the resource division 712 and provides the setting information on the resource division 712 to the resource requesting unit 63.

In this example, the resource allocation unit 62 considers the resource sharability among policies when determining the divisible resource 71 to be allocated and an area of the divisible resource 71 to be allocated to the resource division 712.

This example can reduce the generation of a condition in which, when resource allocation requests are issued one after another, a resource cannot be allocated to a request in spite of the fact that a resource could be allocated to that request if an earlier allocation request was allocated to some other resource, because an allocation destination is determined considering resource sharability among policies.

The present invention is applicable to an allocation system that selects an allocation destination from multiple storage devices in response to a storage area allocation request and allocates a storage area thereon The present invention is applicable also to a recommended allocation destination presentation system that presents an allocation destination in response to an input specifying an allocation condition of a requested storage area.

It is to be understood that the entire disclosures of the above mentioned Patent Document and Non-Patent Document are incorporated herein by reference thereto. The examples and examples may be changed or adjusted within the scope of the disclosure of the present invention (including claims) and based on the basic technological concept. A variety of combinations or selections of various disclosed elements are possible within the scope of the claims of the present invention. That is, the present invention of course includes various changes and modifications that would be made by those skilled in the art according to the disclosure including the claims and according to the technical concepts.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A resource allocation system comprising:
a resource information storage unit that holds resource information on a plurality of storage devices;
a policy storage unit that stores policy information on resource allocation;
a provisional allocation information storage unit;
a shared resource information storage unit;
a determination index storage unit;
a provisional allocation execution unit that derives a provisional allocation and stores a logical capacity of the storage device, in the provisional allocation information storage unit, based on the resource information on the storage device stored in the resource information storage unit and the policy information stored in the policy storage unit, the provisional allocation corresponding to an allocation configuration in which a maximum capacity of a storage area satisfying a condition of a policy can be allocated on the storage device, the logical capacity being found when the provisional allocation is performed;
a shared resource extraction unit that extracts a sharable resource, which can be temporarily allocated on the storage device for a plurality of policies, based on the information stored in the resource information storage unit and the provisional allocation information storage unit and stores the extracted sharable resource information in the shared resource information storage unit;
a determination index calculation unit that calculates a determination index for each of the plurality of storage devices based on the logical capacity stored in the provisional allocation information storage unit and the shared resource information stored in the shared resource information storage unit and stores the calculated determination index in the determination index storage unit, the determination index being a value of an allocatable capacity corrected in accordance with resource sharability among policies; and
a determination unit that compares the determination indexes of storage devices stored in the determination index storage unit to determine a storage device in which an allocation of a storage area is performed.

2. The resource allocation system according to claim 1, further comprising:
a request processing unit that receives a request entered from a requesting device, and sends an allocation completion response to the requesting device, when allocation processing is completed;
a resource information collection unit that collects resource information on the plurality of storage devices and stores the collected resource information in the resource information storage unit; and
an allocation instruction unit that instructs the storage device to perform allocation and, when an allocation execution completion notification is received from the storage device, instructs the request processing unit to send the allocation completion response to the request processing unit.

3. The resource allocation system according to claim 1, wherein
the determination unit compares the determination indexes of the storage devices;
based on a relation between the determination index and the resource sharability, selects the storage device with a higher determination index if a value of the determination index corresponding to a relatively higher resource sharability is low and a value of the determination index corresponding to a relatively lower resource sharability is high; and
selects an area with a lower sharability degree from areas of the selected storage device as an area to which a storage area is allocated.

4. The resource allocation system according to claim 1, wherein
the determination unit compares the determination indexes of the storage devices;
based on a relation between the determination index and the resource sharability, selects the storage device with a lower determination index, if a value of the determination index corresponding to a relatively higher resource sharability is high and a value of the determination index corresponding to a relatively lower resource sharability is low; and
selects an area with a lower sharability degree from areas of the selected storage device as an area to which a storage area is allocated.

5. The resource allocation system according to claim 1, wherein
the determination index calculation unit calculates the determination index, for a combination of a storage device and a policy, as a product of
an allocatable logical capacity that is a logical capacity when a maximum capacity allocatable for the policy is allocated on the storage device, and
an adjustment coefficient that is an index representing resource sharability, the adjustment coefficient having a value dependent on an area of a resource allocatable for a policy and allocatable also for an other policy on the storage device and dependent on a number of policies allocatable to the area.

6. The resource allocation system according to claim 5, wherein the determination index calculation unit calculates the adjustment coefficient by dividing a resource amount allocatable for the policy and with a sharability degree m by the resource amount allocatable for the policy;

multiplying the division result by an inverse number of the sharability degree m or by a value obtained by exponentiation of the inverse number; and calculating a sum of the multiplication result for all values of m.

7. The resource allocation system according to claim 6, wherein, when the resource amount allocatable for the policy is 0, the adjustment coefficient is 1.

8. The resource allocation system according to claim 2, wherein the resource information collection unit, the resource information storage unit, the provisional allocation execution unit, the provisional allocation information storage unit, the shared resource extraction unit, the shared resource information storage unit, the determination index storage unit, the determination index calculation unit, the determination unit, the allocation instruction unit, and the request processing unit are provided in a management server.

9. The resource allocation system according to claim 2, wherein the resource information collection unit, the resource information storage unit, the provisional allocation execution unit, the provisional allocation information storage unit, the shared resource extraction unit, the shared resource information storage unit, the determination index storage unit, and the determination index calculation unit are provided in the storage device, and the determination unit, the allocation instruction unit, and the request processing unit are provided in a management server.

10. A resource allocation system that controls resource allocation, comprising:

a policy storage unit that stores a plurality of policies for resource allocation;

a shared resource extraction unit that extracts a resource which is simultaneously allocatable to at least two different policies of the plurality of policies; and a determination index calculation unit that calculates a determination index that depends on resource sharability among the plurality of policies, the determination index calculation unit calculates the determination index (k,n) (where, k and n are an identification symbol of a storage device and an identification symbol of a policy, respectively) as a product of an allocatable logical capacity (k,n) and an adjustment coefficient (k,n) and the adjustment coefficient (k,n) is calculated as $$\text{Adjustment coefficient}(k, n) = \sum_m \left( \frac{\text{Amount of resources allocatable for policy } n \text{ and with sharability degree of } m}{\text{Amount of resources allocatable for policy } n} \times \frac{1}{m} \right)$$

where the adjustment coefficient (k,n)=1 when the resource mount allocatable for policy n is 0.

11. The resource allocation system according to claim 10, wherein, when the determination index (k,n) is calculated, the determination index calculation unit uses a value, calculated by dividing the allocatable logical capacity (k,n) by a whole logical capacity of the storage device including allocated areas, instead of the allocatable logical capacity (k,n), and produces the determination index (k,n) by multiplying the resulting value by the adjustment coefficient (k,n).

12. The resource allocation system according to claim 10, wherein, when the determination index (k,n) is calculated, the determination index calculation unit uses an allocatable logical capacity remaining after a requested capacity is allocated, instead of the allocatable logical capacity (k,n), and produces the determination index (k,n) by multiplying the allocatable logical capacity by the adjustment coefficient (k,n).

13. A resource allocation system that controls resource allocation, comprising:

a policy storage unit that stores a plurality of policies for resource allocation;

a shared resource extraction unit that extracts a resource which is simultaneously allocatable to at least two different policies of the plurality of policies; and a determination index calculation unit that calculates a determination index that depends on resource sharability among the plurality of policies, the determination index calculation unit calculates the determination index (k,n) (where, k and n are an identification symbol of a storage device and an identification symbol of a policy) as a product of an allocatable logical capacity (k,n) and an adjustment coefficient (k,n) and the adjustment coefficient (k,n) is calculated as $$\text{Adjustment coefficient}(k, n) = \sum_m \left( \frac{\text{Amount of resources allocatable for policy } n \text{ and with sharability degree of } m}{\text{Amount of resources allocatable for policy } n} \times \frac{1}{m^p} \right)$$

where the adjustment coefficient (k,n)=1 when the resource mount allocatable for policy n is 0.

14. A resource allocation method comprising:

deriving a provisional allocation and storing a logical capacity in a provisional allocation information storage unit, based on resource information on storage devices stored in a resource information storage unit and policy information stored in a policy storage unit, the provisional allocation corresponding to an allocation configuration in which a maximum capacity of a storage area satisfying a condition of a policy can be allocated on a storage device, the logical capacity being found when the provisional allocation is performed;

extracting sharable resources, which can be temporarily allocated for a plurality of policies when the provisional allocation of each policy is performed for the storage device, based on the information stored in the resource information storage unit and the provisional allocation information storage unit, and storing shared resource information in a shared resource information storage unit;

calculating a determination index for each storage device, based on the logical capacity stored in the provisional allocation information storage unit and the shared resource information stored in the shared resource information storage unit and storing the calculated determination index in a determination index storage unit, the determination index being a value of an allocatable capacity corrected in accordance with resource sharability among policies; and determining a storage device in which a storage area is to be allocated by comparing the determination indexes of the storage devices stored in the determination index storage unit.

15. The resource allocation method according to claim 14, further comprising:
- receiving a request entered from a requesting device and sending an allocation completion response to the requesting device when allocation processing is completed;
- collecting resource information on the storage devices and storing the collected resource information in the resource information storage unit; and
- instructing the storage device to perform allocation and, when an allocation execution completion notification is received from the storage device, sending the allocation completion response to the request processing unit via the requesting processing step.

16. The resource allocation method according to claim 14, wherein the relationship between the determination index and the resource sharability is checked to select the storage device with a higher determination index, if a value of the determination index corresponding to a relatively higher resource sharability is low and a value of the determination index corresponding to a relatively lower resource sharability is high; and
- an area with a lower sharability degree is selected from areas of the selected storage device as an area to which a storage area is allocated.

17. The resource allocation method according to claim 14, wherein the relationship between the determination index and the resource sharability is checked to select the storage device with a lower determination index, if a value of the determination index corresponding to a relatively higher resource sharability is high and a value of the determination index corresponding to a relatively lower resource sharability is low; and
- an area with a lower sharability degree is selected from areas of the selected storage device as an area to which a storage area is allocated.

18. The resource allocation method according to claim 14, wherein, for a combination of a storage device and a policy, the determination index is given by a product of
- an allocatable logical capacity that is a logical capacity when a maximum capacity allocatable for the policy is allocated on the storage device and
- an adjustment coefficient that is an index representing resource sharability, the adjustment coefficient having a value dependent on an area of a resource allocatable for a policy and allocatable also for an other policy on the storage device and dependant on a number of policies allocatable to the area.

19. The resource allocation method according to claim 18, wherein
the adjustment coefficient is calculated by
- dividing a resource amount allocatable for the policy and with a sharability degree m, by the resource amount allocatable for the policy;
- multiplying the division result by an inverse number of the sharability degree m or by a value obtained by exponentiation of the inverse number; and
- calculating a sum of the multiplication result for all values of m.

20. The resource allocation method according to claim 16, wherein, when the resource amount allocatable for the policy is 0, the adjustment coefficient is 1.

21. A non-transitory computer readable medium having a computer program for causing computer to execute:
- a provisional allocation execution process of deriving a provisional allocation and storing a logical capacity in a provisional allocation information storage unit, based on resource information on storage devices stored in a resource information storage unit and policy information stored in a policy storage unit, the provisional allocation corresponding to an allocation configuration in which a maximum capacity of a storage area satisfying a condition of a policy can be allocated on a storage device, the logical capacity being found when the provisional allocation is performed;
- a shared resource extraction process of extracting sharable resources, which can be temporarily allocated for a plurality of policies when the provisional allocation of each policy is performed for the storage device, based on the information stored in the resource information storage unit and the provisional allocation information storage unit, and storing shared resource information in a shared resource information storage unit;
- a determination index calculation process of calculating a determination index for each storage device based on the logical capacity stored in the provisional allocation information storage unit and the shared resource information stored in the shared resource information storage unit and storing the calculated determination index in a determination index storage unit, the determination index being a value of an allocatable capacity corrected in accordance with resource sharability among policies; and
- a determination process of determining a storage device in which a storage area is to be allocated by comparing the determination indexes of the storage devices stored in the determination index storage unit.

\* \* \* \* \*